(12) United States Patent
Kamineni et al.

(10) Patent No.: US 12,498,402 B2
(45) Date of Patent: Dec. 16, 2025

(54) METHOD AND STRUCTURE TO INCORPORATE MULTIPLE LOW LOSS PHOTONIC CIRCUIT COMPONENTS

(71) Applicant: PsiQuantum, Corp., Palo Alto, CA (US)

(72) Inventors: Vimal Kamineni, Mechanicville, NY (US); Nicholas V. LiCausi, Watervliet, NY (US); Ann Melnichuk, Rio Rancho, NM (US); James Jay McMahon, Clifton Park, NY (US); Henrik Johansson, Wilton, NY (US); Alexey Vert, Clifton Park, NY (US)

(73) Assignee: PsiQuantum, Corp., Palo Alto, CA (US)

( * ) Notice: Subject to any disclaimer, the term of this patent is extended or adjusted under 35 U.S.C. 154(b) by 287 days.

(21) Appl. No.: 18/247,059

(22) PCT Filed: Sep. 28, 2021

(86) PCT No.: PCT/US2021/052480
§ 371 (c)(1),
(2) Date: Mar. 28, 2023

(87) PCT Pub. No.: WO2022/067268
PCT Pub. Date: Mar. 31, 2022

(65) Prior Publication Data
US 2023/0366913 A1 Nov. 16, 2023

Related U.S. Application Data

(60) Provisional application No. 63/084,485, filed on Sep. 28, 2020.

(51) Int. Cl.
*G01R 15/24* (2006.01)
*G01J 1/44* (2006.01)
(Continued)

(52) U.S. Cl.
CPC .............. *G01R 15/242* (2013.01); *G01J 1/44* (2013.01); *G01J 5/0818* (2013.01);
(Continued)

(58) Field of Classification Search
CPC . G01R 15/242; H10F 77/1437; H10F 39/107; G01J 5/0818
See application file for complete search history.

(56) References Cited

U.S. PATENT DOCUMENTS 6,919,508 B2    7/2005   Forcier
7,170,142 B2    1/2007   Wojcik et al.
(Continued)

FOREIGN PATENT DOCUMENTS

CA       3117783 A1    4/2020
CN    102208425 A    10/2011
(Continued)

OTHER PUBLICATIONS

El Dirani, H., et al., "Ultralow-loss tightly confining Si3N4 waveguides and high-Q microresonators," Optics Express, Oct. 2019, vol. 27(21), pp. 30726-30740.
(Continued)

*Primary Examiner* — Sung H Pak
(74) *Attorney, Agent, or Firm* — Schwegman Lundberg & Woessner, P.A.

(57) ABSTRACT

A photonic integrated circuit including a substrate, a plurality of oxide layers on the substrate, and various passive and active integrated optical components in the plurality of oxide layers. The integrated optical components include silicon nitride waveguides, a Pockels effect phase shifter (e.g., $BaTiO_3$ phase shifter), a superconductive nanowire single photon detector (SNSPD), an optical isolation structure surrounding the SNSPD, a single photon generator, a thermal isolation structure, a heater, a temperature sensor, a
(Continued)

photodiode for data communication (e.g., a Ge photodiode), or a combination thereof.

19 Claims, 22 Drawing Sheets

(51) Int. Cl.
  *G01J 5/0818* (2022.01)
  *G01R 13/02* (2006.01)
  *G02F 1/035* (2006.01)
  *H10F 39/10* (2025.01)
  *H10F 77/14* (2025.01)

(52) U.S. Cl.
  CPC ......... *G01R 13/0281* (2013.01); *G02F 1/035* (2013.01); *H10F 39/107* (2025.01); *H10F 77/1437* (2025.01); *G01J 2001/442* (2013.01)

(56) References Cited

U.S. PATENT DOCUMENTS

| | | | |
|---|---|---|---|
| 7,224,878 | B1 | 5/2007 | Wessels et al. |
| 7,483,140 | B1 | 1/2009 | Cho et al. |
| 8,531,045 | B2 | 9/2013 | Kärkkinen |
| 8,558,336 | B2 | 10/2013 | Su et al. |
| 8,633,067 | B2 | 1/2014 | Assefa et al. |
| 8,866,187 | B2 | 10/2014 | Na et al. |
| 9,048,371 | B2 | 6/2015 | Ang et al. |
| 9,105,772 | B2 | 8/2015 | Pomerene et al. |
| 9,117,946 | B2 | 8/2015 | Assefa et al. |
| 9,322,901 | B2 | 4/2016 | Kerness et al. |
| 9,470,956 | B2 | 10/2016 | Mazur et al. |
| 9,524,898 | B2 | 12/2016 | Cheng et al. |
| 9,772,447 | B2 | 9/2017 | Keyvaninia et al. |
| 9,971,228 | B2 | 5/2018 | Mazur et al. |
| 10,305,250 | B2 | 5/2019 | Bhattacharya et al. |
| 10,734,533 | B2 | 8/2020 | Cheng et al. |
| 12,176,672 | B2 | 12/2024 | Dudley et al. |
| 2008/0116537 | A1 | 5/2008 | Adkisson et al. |
| 2009/0020701 | A1 | 1/2009 | Frey |
| 2010/0244173 | A1 | 9/2010 | Wang et al. |
| 2013/0082286 | A1 | 4/2013 | Finkelstein et al. |
| 2014/0299751 | A1 | 10/2014 | Tang et al. |
| 2015/0125111 | A1* | 5/2015 | Orcutt ............. G02B 6/12004 438/701 |
| 2017/0139132 | A1 | 5/2017 | Patel et al. |
| 2017/0148837 | A1 | 5/2017 | Hiyama et al. |
| 2021/0242651 | A1 | 8/2021 | Dudley et al. |
| 2025/0087959 | A1 | 3/2025 | Dudley et al. |

FOREIGN PATENT DOCUMENTS

| | | |
|---|---|---|
| CN | 104051477 A | 9/2014 |
| CN | 113519057 A | 10/2021 |
| EP | 3871261 A1 | 9/2021 |
| EP | 4217795 A2 | 8/2023 |
| TW | 202229949 A | 8/2022 |
| WO | WO-2013142815 A1 | 9/2013 |
| WO | WO-2020087025 A1 | 4/2020 |
| WO | WO-2022067268 A2 | 3/2022 |

OTHER PUBLICATIONS

Elshaari, A. W., et al., "Hybrid Integrated Quantum Photonic Circuits," Nature Photonics, Apr. 13, 2020, vol. 14(5), pp. 285-298.
Eltes, F., et al., "A BaTiO$_3$-Based Electro-Optic Pockels Modulator Monolithically Integrated on an Advanced Silicon Photonics Platform," Journal of Lightwave Technology, Mar. 2019, vol. 37(5), pp. 1456-1462.
Eltes, F., et al., "An integrated cryogenic optical modulator," arXiv:1904.10902v1 [physics.app-ph], Apr. 24, 2019, 14 pages, URL: https://arxiv.org/abs/1904.10902v1.
Frigg, A., et al., "Low loss CMOS-compatible silicon nitride photonics utilizing reactive sputtered thin films," Optics Express, Dec. 2019, vol. 27(26), pp. 37795-37805.
Frigg, A., et al., "Optical frequency comb generation with low temperature reactive sputtered silicon nitride waveguides," APL Photonics, Jan. 22, 2020, vol. 5(1), 011302, pp. 1-6.
Hsu, T. H., et al., "Dramatic Reduction of Optical Crosstalk in Deep-Submicrometer CMOS Imager With Air Gap Guard Ring," IEEE Electron Device Letters, Jun. 2004, vol. 25(6), pp. 375-377.
Häußler, M., et al., "Amorphous superconducting nanowire single-photon detectors integrated with nanophotonic waveguides," APL Photonics, Jul. 10, 2020, vol. 5(7), 076106, pp. 1-7.
International Search Report and Written Opinion dated Apr. 13, 2022 in PCT Application No. PCT/US2021/052480, 16 pages.
International Search Report and Written Opinion dated Feb. 19, 2020 in Application No. PCT/US2019/058190, 12 pages.
Kim, J., et al., "Hybrid Integration Methods for on-chip Quantum Photonics," Optica, Apr. 8, 2020, vol. 7(4), pp. 291-308.
Ortmann, J. E., et al., "Ultra-Low-Power Tuning in Hybrid Barium Titanate-Silicon Nitride Electro-optic Devices on Silicon," ACS Photonics, Oct. 2, 2019, vol. 6(11), pp. 2677-2684.
Schwartz, M., et al., "Fully on-chip single-photon Hanbury-Brown and Twiss experiment on a monolithic semiconductor-superconductor platform," arXiv:1806.04099v1 [physics.app-ph], Jun. 11, 2018, pp. 1-21, URL: https://arxiv.org/abs/1806.04099v1.
Schwartz, M., et al., "Generation, guiding and splitting of triggered single photons from a resonantly excited quantum dot in a photonic circuit," Optics Express, 2016, vol. 24(3), pp. 3089-3094.
Shaw, M. J., et al., "Fabrication techniques for low-loss silicon nitride waveguides," Micromachining Technology for Micro-Optics and Nano-Optics III, Jan. 22, 2005, Proc. of SPIE, vol. 5720, pp. 109-118.
Silverstone, J. W., et al., "Silicon Quantum Photonics," IEEE Journal of Selected Topics in Quantum Electronics, 2016, vol. 22(6), pp. 390-402.
Tut, T., et al., "Vertical waveguides integrated with silicon photodetectors: Towards high efficiency and low cross-talk image sensors," Applied Physics Letters, Jan. 24, 2012, vol. 100(4), 043504, pp. 1-3.
Wilmart, Q., et al., "A Versatile Silicon-Silicon Nitride Photonics Platform for Enhanced Functionalities and Applications," Applied Sciences, Jan. 11, 2019, vol. 9(2), 255, pp. 1-16.
U.S. Corrected Notice of Allowability dated Sep. 12, 2024 in U.S. Appl. No. 17/239,085.
U.S. Final Office Action dated Apr. 25, 2024 in U.S. Appl. No. 17/239,085.
U.S. Non-Final Office Action dated Jan. 5, 2024 in U.S. Appl. No. 17/239,085.
U.S. Notice of Allowance dated Aug. 8, 2024 in U.S. Appl. No. 17/239,085.

* cited by examiner

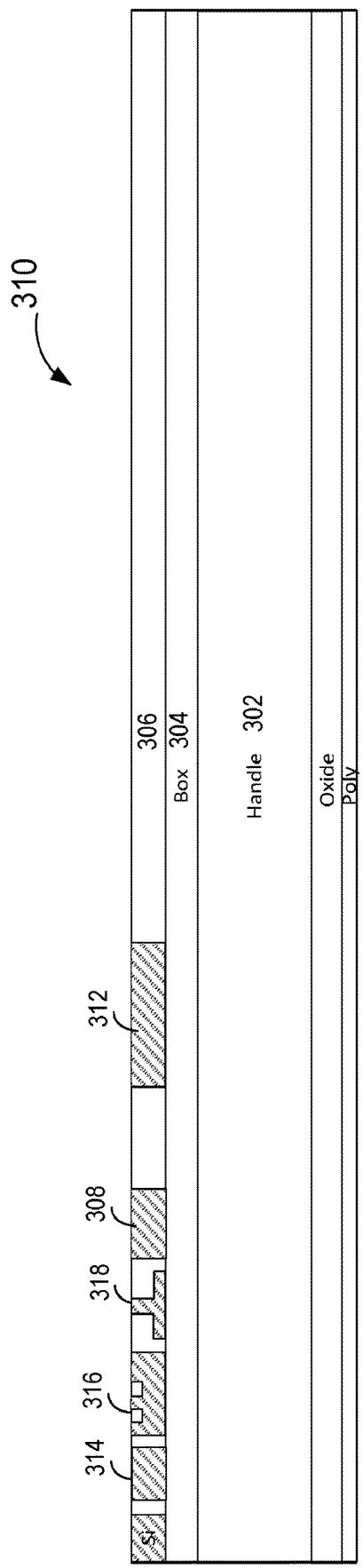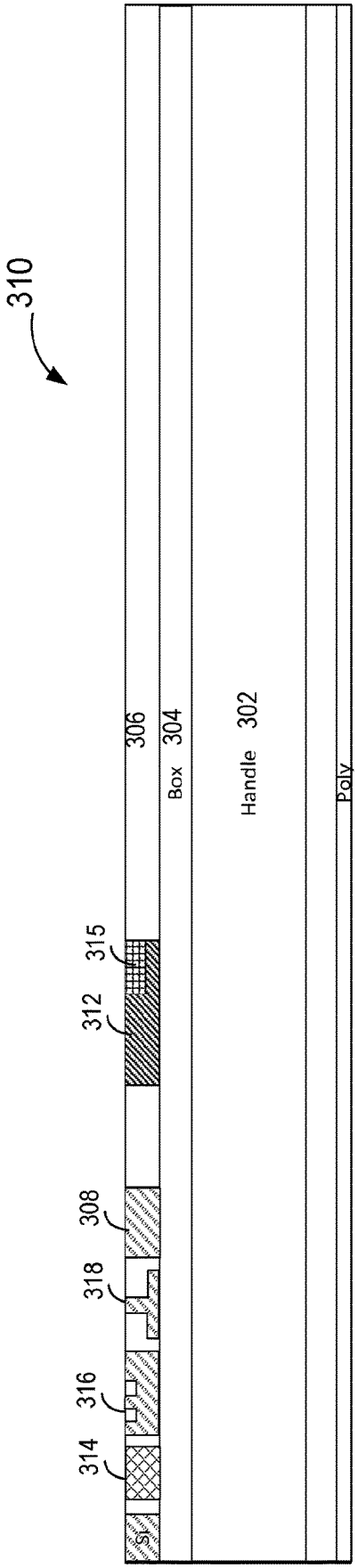
FIG. 3A
FIG. 3B

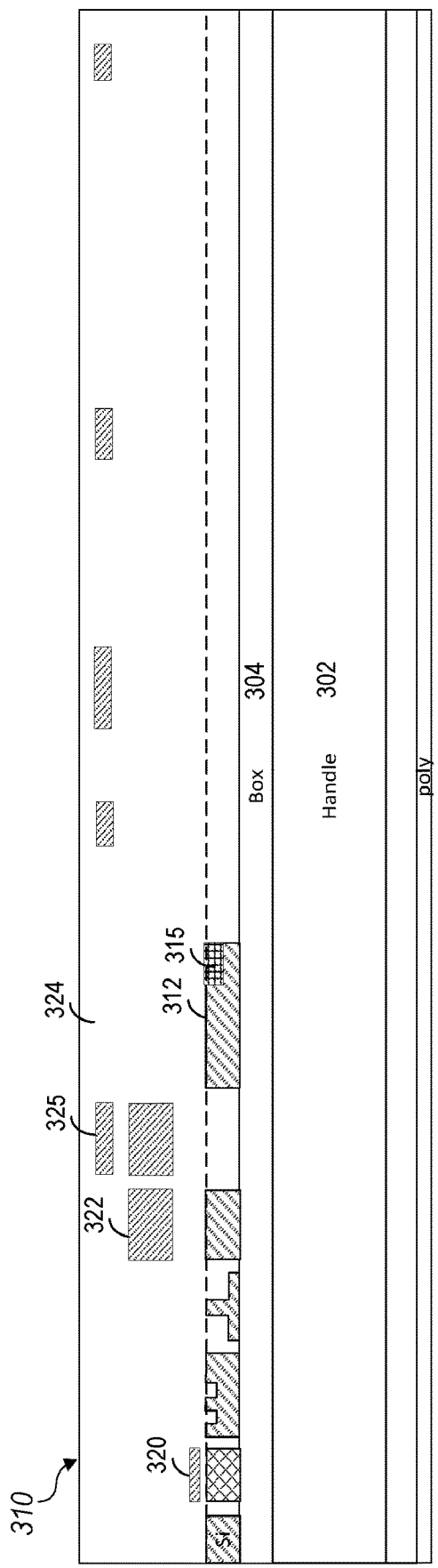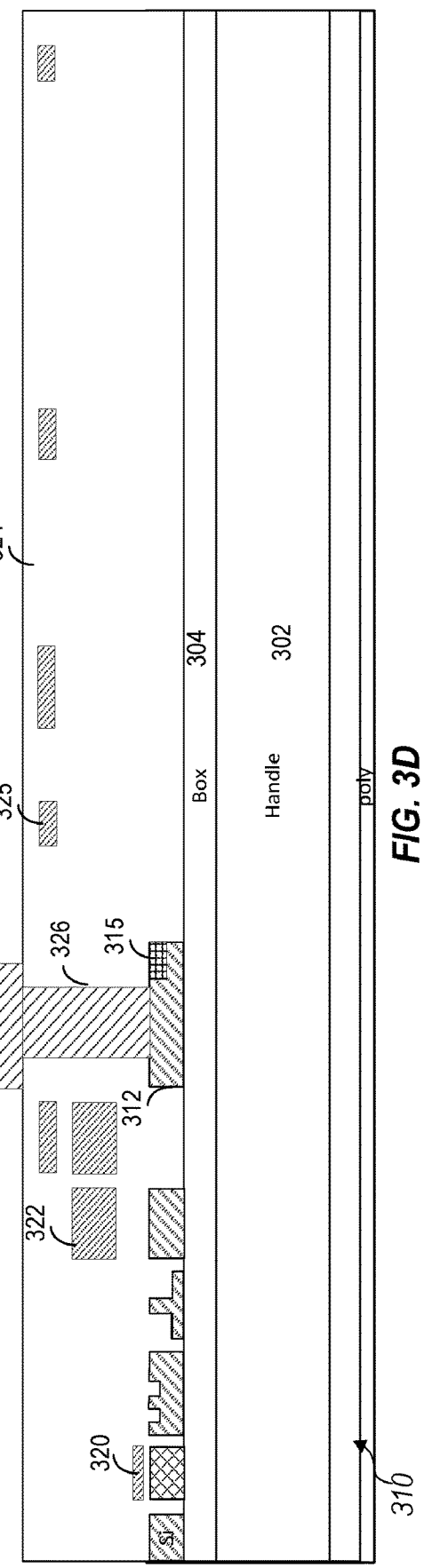
FIG. 3C
FIG. 3D

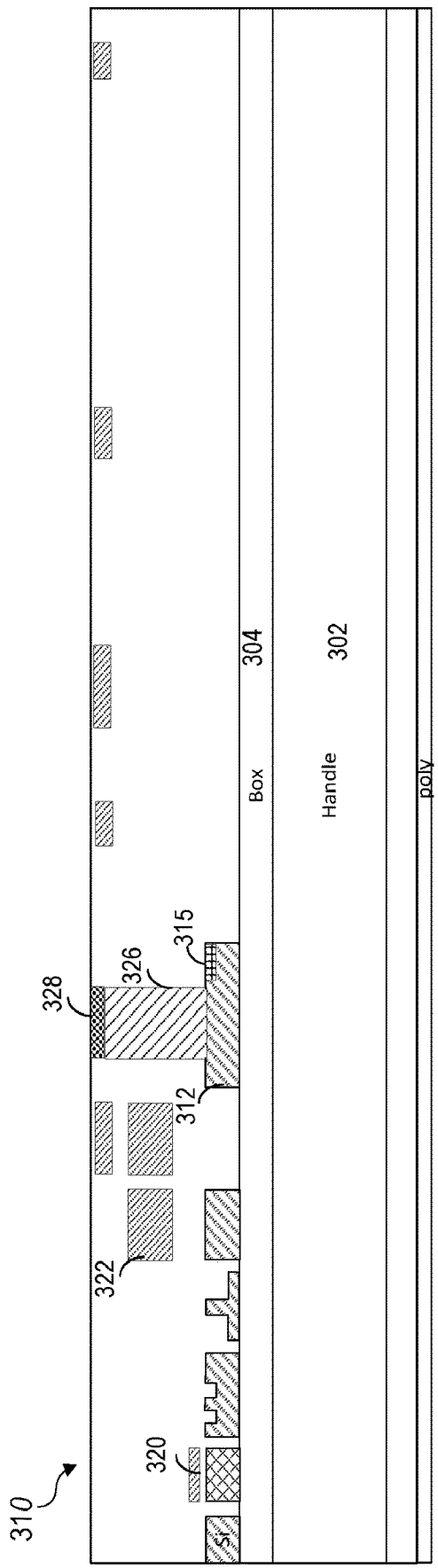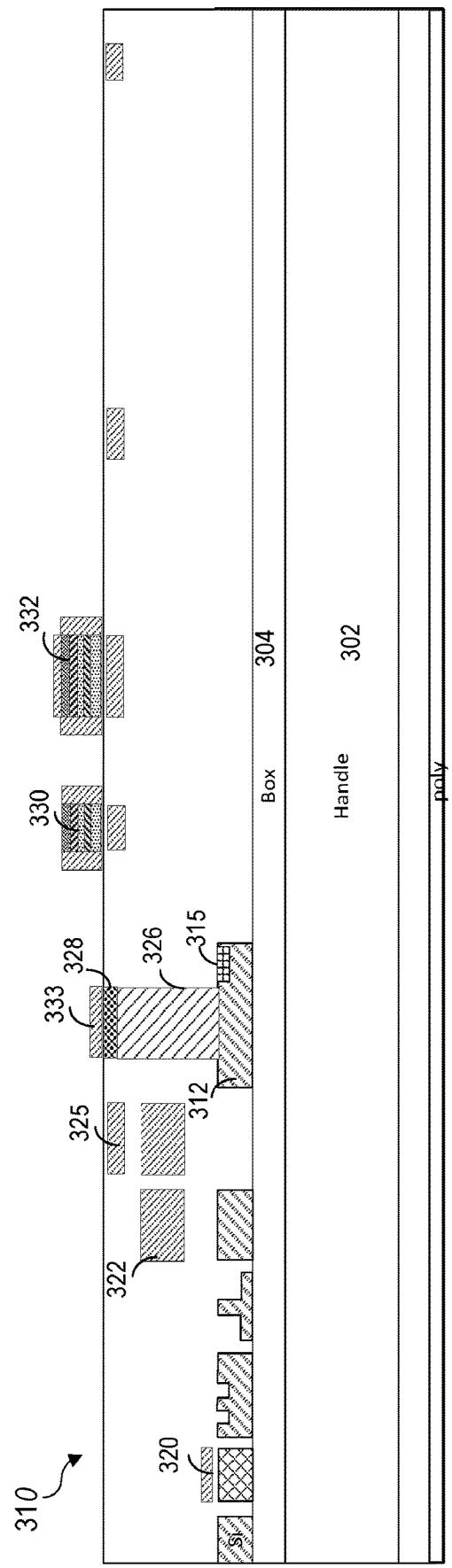

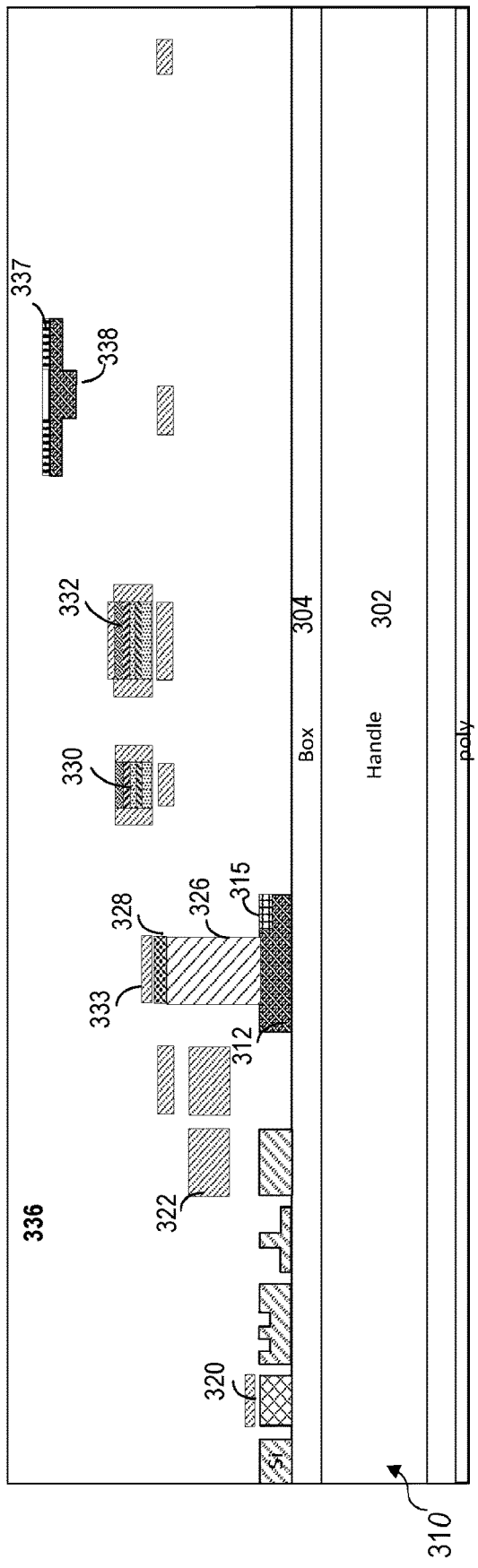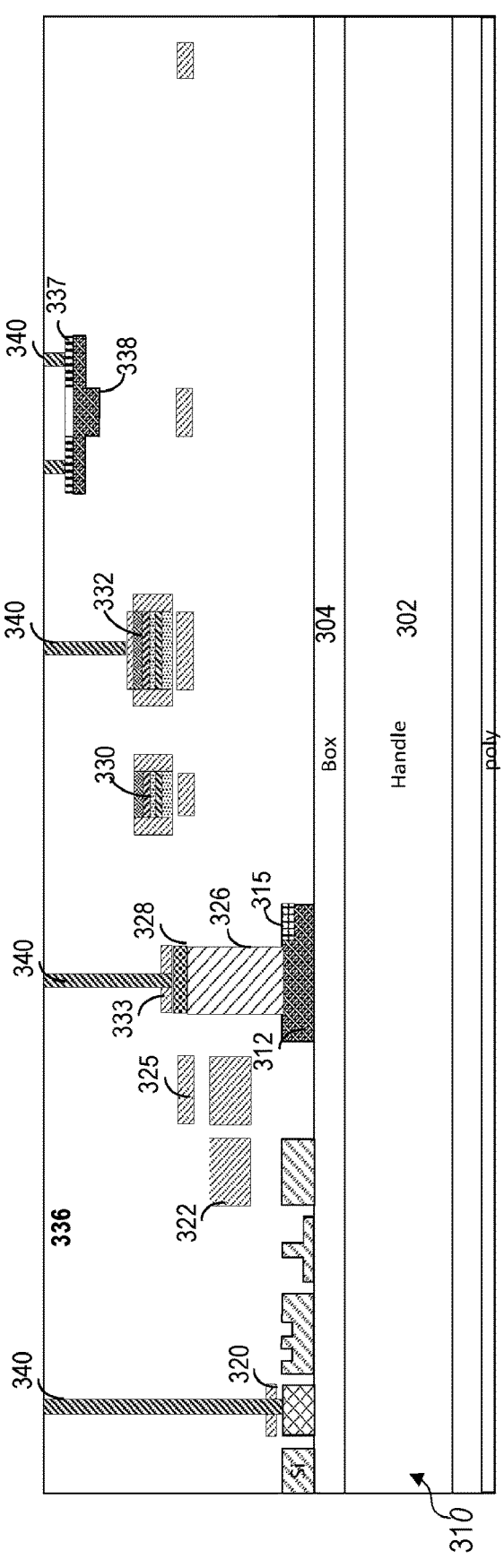

$$W = \left(S_{N/n_1,n_1} I^{(N/n_1)} \otimes W^{(n_1)}\right) \left(W^{(n_1)} \otimes I^{(N/n_1)} S^t_{N/n_1,n_1}\right) \left(I^{(n_1)} \otimes S_{N/(n_1 n_2),n_2} I^{(N/n_2)} \otimes W^{(n_2)}\right) \cdots \left(I^{(N/n_r)} \otimes W^{(n_r)}\right)$$

$$= \left(I^{(n_1)} \otimes S_{N/(n_1 n_2), n_2} W^{(n_2)} I^{(N/n_2)} \otimes S^t_{N/(n_1 n_2), n_2}\right) \cdots \left(I^{(N/n_r)} \otimes W^{(n_r)}\right)$$

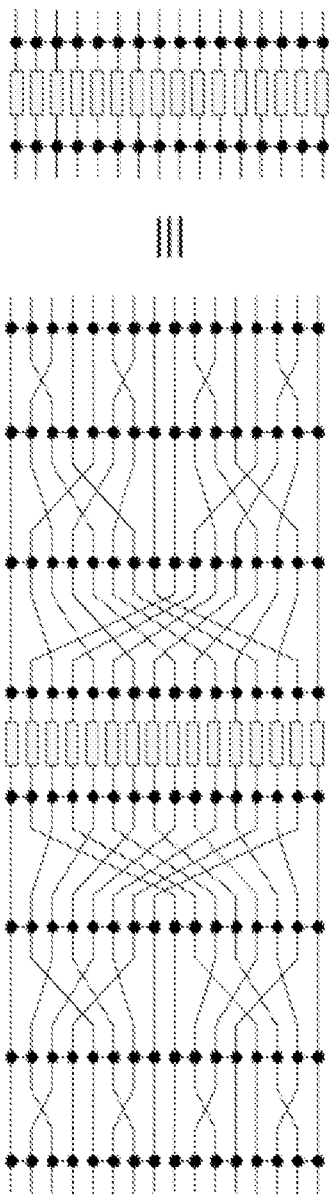
(i) N=16 Hadamard-type GMZI construction
*FIG. 13A*
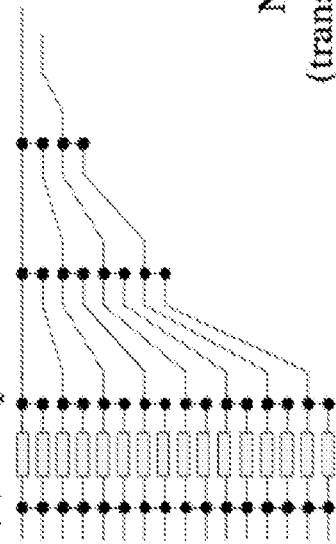
(ii) Simplified GMZI for use as a 16-to-1 mux
Circuit notation
$N=2^n$
N-mode Hadamard interferometer
(transfer matrix is N×N Hadamard matrix)
*FIG. 13B*

METHOD AND STRUCTURE TO INCORPORATE MULTIPLE LOW LOSS PHOTONIC CIRCUIT COMPONENTS

CROSS-REFERENCES TO RELATED APPLICATIONS

This patent application is a U.S. national stage entry under 35 U.S.C. § 371 of International Application No. PCT/US2021/052480, filed Sep. 28, 2021, entitled "METHOD AND STRUCTURE TO INCORPORATE MULTIPLE LOW LOSS PHOTONIC CIRCUIT COMPONENTS," which claims benefit of and priority to U.S. Provisional Patent Application No. 63/084,485, filed Sep. 28, 2020, entitled "METHOD AND STRUCTURE TO INCORPORATE MULTIPLE LOW LOSS PHOTONIC CIRCUIT COMPONENTS," the disclosures of which are assigned to the assignee hereof and are hereby incorporated by reference in their entireties for all purposes.

BACKGROUND

Photonic integrated circuits, such as silicon photonic integrated circuits, can be used in many systems, such as communication systems and optical quantum computing systems. A system including photonic integrated circuits may need to integrate many passive and active photonic devices into the same system (e.g., a same die, a same wafer, or a same package) that has a high integration density and can be reliably and efficiently manufactured. For example, an optical quantum computer may need to use many qubits, such as hundreds, thousands, or even millions of qubits, for computing and error corrections. To achieve the desired functions and performance, the optical quantum computer may integrate many passive and active photonic devices, modules, and subsystems into the same system to generate and process the qubits. For example, the optical quantum computer may need to integrate optical fibers or other low-loss optical interconnects (e.g., waveguides), active photonic devices, control circuits, classical processing units, and the like, into a same system to reliably generate, manipulate (e.g., entangle), and detect hundreds, thousands, or even millions of qubits. Integrating many different types of photonic components and electronic components made of different materials into a same integrated system while achieving a high integration density, low loss, a high manufacturability remains a challenge.

SUMMARY

Techniques disclosed herein relate generally to photonic integrated circuits. More specifically, and without limitation, disclosed herein are structures and methods for integrating various photonic integrated circuit components into a system using semiconductor processing technology. Various inventive embodiments are described herein, including methods, processes, systems, devices, wafers, dices, packages, modules, and the like.

In accordance with an example implementation, a photonic integrated circuit may include a substrate, a plurality of oxide layers on the substrate, silicon nitride waveguides in the plurality of oxide layers and configured to transport photons, a Pockels effect optical phase shifter in the plurality of oxide layers and configured to change phase delays of photons transported by a first SiN waveguide of the SiN waveguides, a superconducting nanowire single photon detector (SNSPD) in the plurality of oxide layers and configured to detect photons transported by a second SiN waveguide of the SiN waveguides, and an optical isolation structure in the plurality of oxide layers, where the optical isolation structure at least partially surrounds the SNSPD and is configured to block stray light.

In some embodiments, the Pockels effect optical phase shifter may include, for example, a $BaTiO_3$ optical phase shifter of an optical switch. The optical isolation structure surrounding the SNSPD may include a portion of a silicide layer, a portion of a metal layer, a metal trench, or a combination thereof. The SiN waveguides may be on two or more SiN layers that are characterized by different thicknesses and different losses.

In some embodiments, the photonic integrated circuit may also include a single photon generator in the plurality of oxide layers. In some embodiments, the photonic integrated circuit may also include an undercut region formed in the substrate, where the undercut region is below a region of the plurality of oxide layers and is configured to thermally isolate the region of the plurality of oxide layers. In some embodiments, the photonic integrated circuit may also include a silicon grating coupler in the plurality of oxide layers, where the silicon grating coupler is configured to couple light into or out of the SiN waveguides. In some embodiments, the photonic integrated circuit may also include a silicon nitride grating coupler in the plurality of oxide layers, where the silicon nitride grating coupler is configured to couple light between two SiN waveguides of the SiN waveguides. In some embodiments, the substrate may include a V-groove for aligning an optical fiber.

In some embodiments, the photonic integrated circuit may also include a silicon layer on a buried oxide layer of the plurality of oxide layers, a temperature sensor in the plurality of oxide layers, a silicide heating element in the plurality of oxide layers, a Ge photodiode in the plurality of oxide layers and configured to detect optical communication signals, or a combination thereof. In some embodiments, the photonic integrated circuit may also include an optical interposer between the substrate and the plurality of oxide layers, the optical interposer including at least two silicon nitride waveguide layers having different thicknesses.

According to certain embodiments, a method may include fabricating a first wafer that includes a first substrate, a first plurality of oxide layers on the first substrate, silicon nitride waveguides in the first plurality of oxide layers, and a superconductive nanowire single photon detector (SNSPD) in the first plurality of oxide layers; fabricating a second wafer that includes a second substrate, a second plurality of oxide layers on the second substrate, and a Pockels effect optical phase shifter in the second plurality of oxide layers; bonding the first plurality of oxide layers to the second plurality of oxide layers; removing the second substrate; forming electrical connectors in the second plurality of oxide layers and the first plurality of oxide layers; and forming, on the second plurality of oxide layers or the first plurality of oxide layers, a third plurality of oxide layers and one or more metal layers that are in the third plurality of oxide layers and are in electrical connection with the electrical connectors.

In some embodiments of the method, the SiN waveguides may be on two or more SiN layers that have different thicknesses, and fabricating the first wafer may include annealing at least one of the two or more SiN layers at a temperature greater than 1000° C. to reduce N—H and/or Si—H bonds in the SiN layer thereby reducing the loss of the SiN waveguides in the SiN layer. In some embodiments, the first wafer may include an opaque layer (e.g., a silicide layer or a metal layer) that contacts the electrical connectors, where the opaque layer, the electrical connectors, and the one or more metal layers may form an optical isolation structure that surrounds the SNSPD and is configured to block stray light.

In some embodiments, the method may include forming bonding pads or bonding bumps at a surface of the third plurality of oxide layers. In some embodiments, the method may include forming a hole in the first plurality of oxide layers and the second plurality of oxide layers to expose the first substrate, and etching the first substrate through the hole to form an undercut region in the first substrate. In some embodiments, the first wafer may include a grating coupler configured to couple light into the SiN waveguides, and the method may include forming a trench in the third plurality of oxide layers, where the trench may be aligned with the grating coupler and may be used to accommodate an optical fiber or to transport light from an optical fiber to the grating coupler.

According to certain embodiments, a system on a semiconductor substrate may include a plurality of heralded photon sources, a plurality of delay lines, a plurality of single photon detectors, and a switch network. Each heralded photon source of the plurality of heralded photon sources may include a first output and a second output. Each delay line of the plurality of delay lines may be optically coupled to the first output of a respective heralded photon source of the plurality of heralded photon sources. Each single photon detector of the plurality of single photon detectors may be optically coupled to the second output of a respective heralded photon source of the plurality heralded photon sources. The switch network may include a first crossing network including a first set of input ports and a first set of output ports, a second crossing network including a second set of input ports and at least one output port, and a plurality of phase shifters between the first crossing network and the second crossing network. Each input port of the first set of input ports may be optically coupled to an output of a respective delay line of the plurality of delay lines. Each phase shifter of the plurality of phase shifters may optically couple an output port of the first set of output ports of the first crossing network to an input port of the second set of input ports of the second crossing network.

In some embodiments, the plurality of delay lines may include SiN waveguides with a loss lower than 0.5 dB/m. In some embodiments, the plurality of phase shifters may include a plurality of Pockels effect phase shifters. In some embodiments, each single photon detector of the plurality of single photon detectors may include a superconductive nanowire single photon detector. In some embodiments, the first crossing network may include a plurality of Mach-Zehnder interferometers.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 12 includes an equation describing stages of local interference separated by crossing networks.

FIGS. 13A and 13B show Hadamard-type GMZI constructions.

Figure 1:
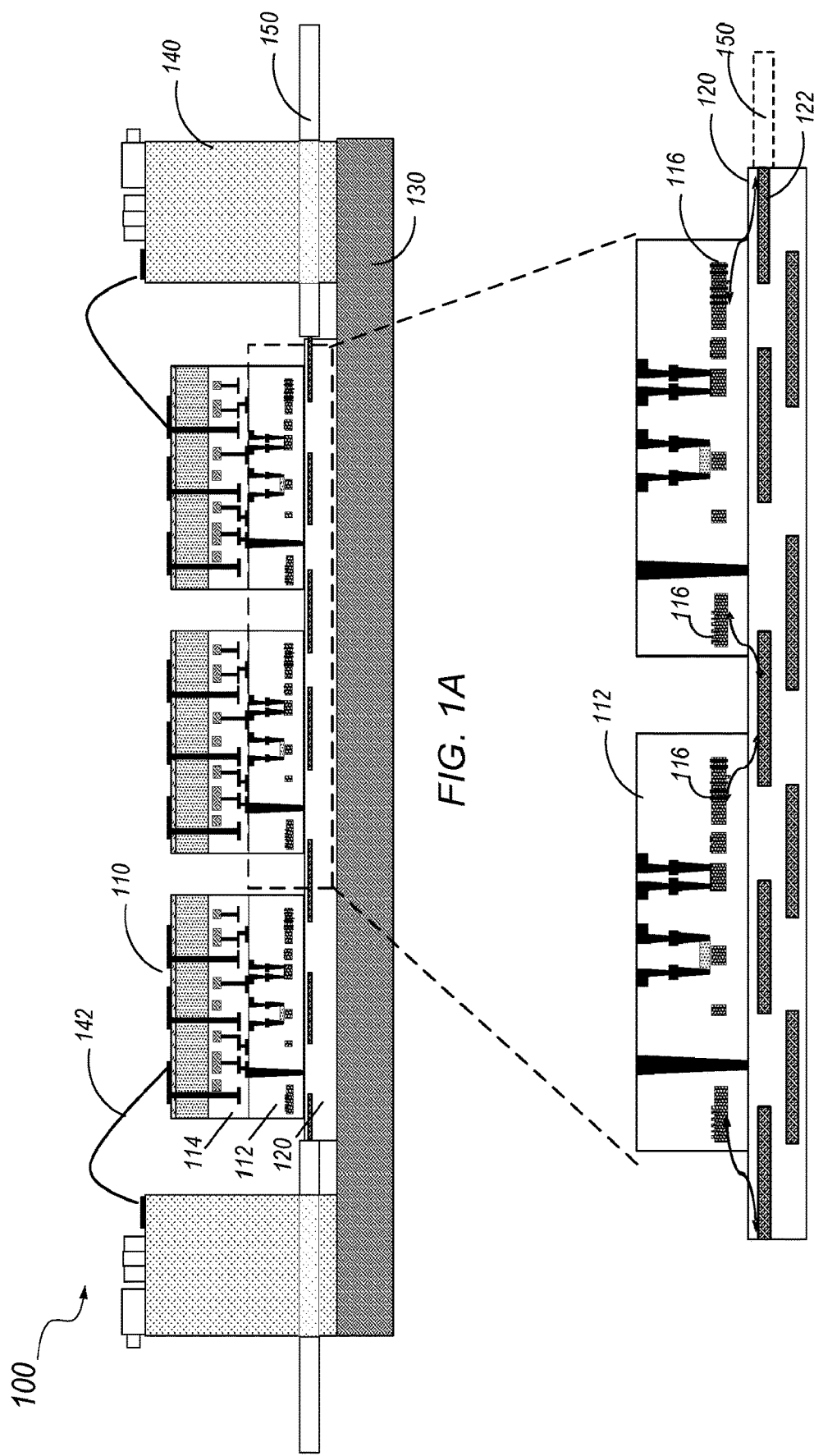
FIG. 1A is a cross-sectional view of an example of a wafer-scale package including multiple electronic integrated circuit (EIC)/photonic integrated circuit (PIC) die stacks bonded to an optical backplane according to certain embodiments.
FIG. 1B is a zoom-in view of an example of a wafer-scale package including multiple EIC/PIC die stacks bonded and optically coupled to an optical backplane according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

DETAILED DESCRIPTION

Techniques disclosed herein relate generally to photonic integrated circuits. More specifically, and without limitation, disclosed herein are structures and methods for integrating various photonic integrated circuit components into a system using semiconductor processing technology. Various inventive embodiments are described herein, including methods, processes, systems, devices, packages, wafers, dies, modules, and the like.

Quantum computing and quantum communication rely on the dynamics of quantum systems, such as photons, electrons, atoms, ions, molecules, nanostructures, and the like, which follow the rules of quantum theory. In quantum theory, the quantum state of a quantum system is described by a set of physical properties, the complete set of which is referred to as a quantum mode. A quantum mode can be defined by, for example, specifying the value (or distribution of values) of one or more properties of the quantum system. In cases where the quantum system is implemented using photons (referred to as "a photonic quantum system"), quantum modes may be defined by the frequency of the photon, the photon's position in space (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, orbital angular momentum, and the like. For the case of photons propagating in waveguides, the state of a photon may be represented by a quantum mode of a set of discrete spatiotemporal modes. For example, the spatial mode of the photon may be determined according to the waveguide in which the photon is propagating among a finite set of discrete waveguides, whereas the temporal mode of a photon may be determined based on the time period in which the photon is present among a set of discrete time periods. Other types of quantum mode, such as polarization modes, may also be used to specify the quantum state.

Many quantum computing or quantum communication systems may use quantum bits (qubits) that are each simultaneously in a coherent superposition of two states to manipulate information through quantum mechanics. Most technologies used to implement qubits have issues such as stability, decoherence, fault tolerance, and scalability issue. For example, one of the main challenges in realizing quantum computation is that decoherence and other quantum noise may destroy the information in a superposition of states in a quantum computer, and inaccuracies in quantum state transformations throughout the computation may accumulate, thus making long computations difficult. To overcome these issues, quantum error correction may be needed to achieve fault-tolerant quantum computation that can deal not only with noise on stored quantum information, but also with faulty quantum gates, faulty quantum preparation, and faulty measurements. In some systems, for the purposes of quantum error correction, many physical qubits may be used to produce an entity (referred to as a logical qubit) which behaves logically as a single qubit would in a quantum circuit or algorithm. Some quantum error correction techniques may store the information of one qubit onto a highly entangled state of multiple qubits, such as 7, 9, or more physical qubits. When more than one level of encoding is used to provide better protection, thousands or more of physical qubits may be needed for each logical qubit. Thus, a logical qubit, such as an error-corrected photonic logical qubit or a fault tolerate photonic channel, may include many entangled physical qubits to provide the stability, error-correction, and fault tolerance needed to perform useful computations. For a quantum computer that may use many logical qubits for computing, thousands or millions of physical qubits may need to be generated, entangled, switched, and detected, which may need a large number of passive/active photonic circuits and components and electronic circuits and components to implement.

It can be very challenging to integrate these photonic and electronic circuits and components into a system that has the desired functions and performance due to the lack of technology to integrate these modules and components into die level or wafer level photonic integrated circuit. Therefore, many modules and components in some photonic systems are generally fabricated as discrete components and then assembled. For example, low-loss SiN waveguide has generally been considered incompatible with Ge photodiode-based detectors. Single photon detectors and low-power Pockets photonic switches (e.g., made of $BaTiO_3$ optical phase shifters) are generally not available in fully integrated circuits that include other active and passive components. Therefore, systems that use these components or structures, such as optical quantum computers, are generally made of discrete components, and thus may be bulky and may not integrate sufficient number of devices and structures to perform the desired function, such as optical quantum computing using hundreds, thousands, or millions of qubits.

According to certain embodiments, a photonic integrated circuit (PIC) may include various passive and active photonic components, such as low-loss waveguides, delay lines, couplers, phase shifters, switches; filters, oscillators/resonators, single photon detectors, and/or bright light (e.g., Ge photodiode-based) photon detectors, integrated on a same wafer or in a same die. The photonic integrated circuit may also include other structures, such as heating or cooling structures, temperature sensors, and thermal and/or optical isolation structures, for controlling and/or improving the performance of certain photonic components. The PIC may also include quantum computing circuits, such as single photon generation circuits, resource state generation circuits (e.g., fusion gates), logic qubit detection circuits, and the like.

In some embodiments, the photonic integrated circuits with the different types of photonic circuit components are fabricated using a semiconductor manufacturing process, such that millions or more of photonic circuit components can be reliably and efficiently manufactured and integrated into a die or a wafer to perform the desired function while reducing the size of the system.

In some embodiments, electronic integrated circuits (EICs) may be bonded to the photonic integrated circuits in a same package. The EIC may include a controller that may be used to, for example, control and/or improve the performance of the photonic integrated circuits, provide inputs to the photonic integrated circuits, and readout outputs from the photonic integrated circuits (e.g., photodetectors and single photon detectors).

In some embodiments, one or more die stacks each including an EIC die and a PIC die may be bonded to a substrate, such as a silicon wafer or an optical backplane. One or more printed circuit boards (PCBs) may also be physically bonded on the substrate and wire-bonded to the one or more die stacks. In some embodiments, optical fibers may be coupled to the PICs and/or the optical backplane. In some embodiments, cooling plates may be attached to the PIC dies and/or the EIC dies to dissipate thermal energy generated by the EICs and/or PICs and keep the device at appropriate temperatures.

According to certain embodiments, the photonic integrated circuit may be fabricated by fabricating a first wafer that includes a first substrate, a first plurality of oxide layers on the first substrate, silicon nitride waveguides in the first plurality of oxide layers, and a superconductive nanowire single photon detector (SNSPD) in the first plurality of oxide layers. The silicon nitride waveguides may be fabricated in an early stage, such that the high-temperature annealing of the silicon nitride waveguides to reduce losses caused by Si—H and/or N—H bonds may not affect other circuits fabricated at later stages. A second wafer that includes a second substrate, a second plurality of oxide layers on the second substrate, and a Pockels effect optical phase shifter (e.g., a $BaTiO_3$ optical phase shifter) in the second plurality of oxide layers may be fabricated and bonded to the first wafer, for example, through oxide-to-oxide bonding. The second substrate may be removed, and electrical connectors may be formed in the second plurality of oxide layers and the first plurality of oxide layers. A third plurality of oxide layers and one or more metal layers that are in the third plurality of oxide layers and are in electrical connection with the electrical connectors may be formed on the second plurality of oxide layers or the first plurality of oxide layers.

As used herein, a "qubit" (or quantum bit) refers to a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of atoms, ions, nuclei, or photons. Other examples may include other engineered quantum systems such as flux qubits, phase qubits, or charge qubits (e.g., formed from a superconducting Josephson junction); topological qubits (e.g., *Majorana* fermions); or spin qubits formed from vacancy centers (e.g., nitrogen vacancies in diamond). A physical qubit may be a physical device that behaves as a two-state quantum system. In one example, a qubit can be "dual-rail encoded" such that the logical value of the qubit is encoded by the occupation of one of two modes of the quantum system.

As used herein, a "resource state" refers to an entangled state of a number of qubits in a non-separable entangled state (which is an entangled state that cannot be decomposed into smaller separate entangled states). In various embodiments, the number of qubits of a resource state can be a small number (e.g., two or more, or any number up to about 20) or a larger number (as large as desired).

As used herein, a "logical qubit" refers to a physical or abstract qubit that has a long enough coherence time to be usable by quantum logic gates. A logical qubit may specify how a single qubit should behave in a quantum algorithm, subject to quantum logic operations by quantum logic gates. Due to issues such as stability, decoherence, fault tolerance, and scalability associated with a physical qubit that includes a single two-state quantum system, physical qubits may not be used to reliably encode and retain information for a sufficiently long period of time to be useful. Therefore, quantum error correction may need to be used to produce scalable quantum computers, where many physical qubits may be used to create a single, error-tolerant logical qubit. Depending on the error-correction scheme used and the error rates of each physical qubit, a single logical qubit may be formed using a large number (e.g., tens, hundreds, thousands, or more) of physical qubits. As used in the following sections, the term "qubit" generally refers to a physical qubit, whereas all references to logical qubits include the qualifier "logical."

As used herein, a "quantum system" may include particles (such as atoms, ions, nuclei, and/or photons) or engineered quantum systems, such as flux qubits, phase qubits, or charge qubits (e.g., formed from a superconducting Josephson junction), topological qubits (e.g., *Majorana* fermions), spin qubits formed from vacancy centers (e.g., nitrogen vacancies in diamond), qubits otherwise encoded in multiple quantum systems (e.g., Gottesman-Kitaev-Preskill (GKP) encoded qubits), entangled states of qubits, and the like.

As used herein, "fusion" (or "a fusion operation" or "fusing") refers to a two-qubit entangling measurement. A "fusion gate" is a structure that receives two input qubits, each of which is typically part of an entangled state of qubits. The fusion gate may perform a projective measurement operation on the input qubits to produce either one (e.g., in "type I fusion") or zero (e.g., in "type II fusion") output qubit in a manner such that the initial two entangled states of qubits are fused into a single entangled state of qubits. Fusion gates are specific examples of a general class of two-qubit entangling measurements and are particularly suited for photonic architectures.

Several illustrative embodiments will now be described with respect to the accompanying drawings. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

A system that generates, manipulates, and/or detects quantum states for optical quantum computing or optical quantum communication may need to integrate passive and active photonic integrated circuits and other optical and electrical components, such as optical fibers or other low-loss optical interconnects (e.g., waveguides), control circuits, and classical processing units, into a same system. To achieve the desired functions and performance, the passive and active photonic integrated circuits and electronic integrated circuits may need to be integrated into one or more dies, one or more wafers, or one or more subsystems that may be connected through low loss connections.

FIG. 1A is a cross-sectional view of an example of a wafer-scale module 100 including multiple EIC/PIC (EPIC) die stacks 110 coupled to an optical backplane 120 according to certain embodiments. FIG. 1B is a zoom-in view of a portion of wafer-scale module 100 according to certain embodiments. FIG. 1B shows the optical coupling between PIC dies 112 and optical backplane 120. Optical backplane 120 may be used as an optical interposer for bonding EPIC die stacks 110 to a substrate and for optically connecting EPIC die stacks 110. In some embodiments, optical backplane 120 may not be used and the EPIC stacks 110 may be bonded to a handle wafer, such as a handle wafer 130.

Wafer-scale module 100 may be used in, for example, optical quantum computers, communication systems, and other electro-optical systems. In the illustrated example, wafer-scale module 100 includes handle wafer 130 with optical backplane 120 formed thereon. Multiple EPIC die stacks 110 may be bonded to optical backplane 120, for example, through oxide-to-oxide bonding. Each EPIC die stack 110 may include an EIC die 114 and a PIC die 112 bonded together through bonding pads or bonding bumps on the EIC die and the PIC die, such that the electrical interconnects between the EIC and the PIC can be short. Electronic backplane devices 140 may be bonded to handle wafer 130 or optical backplane 120. Electronic backplane devices 140 may be electrically connected to EPIC die stacks 110 through, for example, bonding wires 142. Optical fibers 150 may be coupled to optical backplane 120 or PIC die 112 through, for example, edge couplers, tapered structures, evanescent couplers, and/or alignment structures (e.g., V-grooves formed on handle wafer 130).

Wafer-scale module 100 may be used to, for example, generate single photons using a pump laser pulse, waveguides, optical phase shifters, optical switches made using optical phase shifters, interferometers, ring oscillators, couplers, wavelength-division multiplexing (WDM) beam splitter, single photon detectors (e.g., for detecting heralding photons), and the like, through a nonlinear process, such as spontaneous parametric down conversion (SPDC), spontaneous four wave mixing (SFWM), second harmonic generation, or the like. In some embodiments, coherent spatial and/or temporal multiplexing of several non-deterministic photon sources may be performed to increase the probability of generating one photon in any given cycle. In one example, each non-deterministic photon source may include a micro-ring-based SFWM heralded photon source (HAS), where the detection of one photon of a pair of photons generated during the nonlinear process by a single photon detector may herald the existence of the other photon in the pair that may be used to implement a qubit or generate an entangled resource state. Other classes of photon sources that do not use a nonlinear material may also be employed, such as those that employ atomic and/or artificial atomic systems (e.g., quantum dot sources, color centers in crystals, etc.). The operations of some photon sources may be non-deterministic (also sometimes referred to as "stochastic") such that a given pump pulse may or may not produce a pair of photons. In such photon sources, coherent spatial and/or temporal multiplexing of several non-deterministic photon sources may be performed to increase the probability of having one photon in any given cycle. When the number of multiplexed non-deterministic photon sources is large, the probability of having one photon in any given cycle may be about 100%.

Wafer-scale module 100 may also be used to generate resource states or other entangled states of qubits from the single photons using, for example, waveguides, delay lines, couplers, splitters, phase shifter, switches, modulators, fusion gates, and the like. As described above, a qubit may be physically realized using a pair of waveguides into which a single photon is introduced. Qubits can be operated upon using mode couplers (e.g., beam splitters), variable phase shifters, photon detectors, and the like. For instance, entanglement between two (or more) qubits can be created by providing mode couplers between waveguides associated with different qubits. As also described above, physical qubits may suffer from loss and noise. Consequently, relying on single physical qubits (e.g., a photon propagating in a pair of waveguides) when performing a quantum computation may result in an unacceptably high error rate. To provide fault tolerance, photonic quantum computers can be designed to operate on one or more logical qubits, where a logical qubit is a multi-qubit quantum system in an entangled state that enables error correction (also referred to herein as an error correcting code). For example, in some embodiments, the structure of the error correcting code can be represented as a graph in three dimensions. In the context of quantum computing, logical qubits can improve robustness by supporting error detection and error correction. Logical qubits may also be used in other contexts, such as quantum communication.

Wafer-scale module 100 may also be used to detect photons or qubits using, for example, single photon detectors, waveguides, delay lines, and the like. Single photon detectors, such as superconductive nanowire single photon detectors (SNSPDs), may be used to, for example, detect a herald photon that signals the generation of a single photon in a single photon generator, or detect single photons within entangled states (e.g., resource states) in order to detect or perform logical operations on logical quits. In some embodiments, wafer-scale module 100 may include optical isolation structures for scattering mitigation, such that stray light scattered by other circuits in wafer-scale module 100 may not reach the single photon detectors. For example, PIC die 112 may include opaque structures surrounding the single photon detectors to prevent stray light from reaching the single photon detectors. In some embodiments, the single photon detectors may need to operate at very low temperature, such as cryogenic temperatures. Thus, wafer-scale module 100 may also include cooling structures and thermal isolation structures such that heat generated in other regions would not reach regions that need to operate at low temperatures (e.g., cryogenic temperatures). For example, PIC die 112 may include cooling structures, such as metal conductors or microfluidic channels. In some embodiments, PIC die 112 may also include heating elements. In some embodiments, PIC die 112 may also include thermal isolation structures to isolate photonic circuits that may need to operate at low temperatures or to prevent heat loss of heating elements.

In some embodiments, wafer-scale module 100 may include photodetectors or optical transceivers to receive and/or transmit optical communication signals, such as data and timing signals. In one example, wafer-scale module 100 may include Ge photodiode-based photodetectors for receiving data and timing signals from a control unit. In another example, PIC die 112 and EIC die 114 may include optical transceivers for communicating with, for example, a control unit. In some embodiments, PIC die 112 and EIC die 114 may include optical modulators.

FIG. 1B shows examples of optical coupling between PIC dies 112 and optical backplane 120. Optical backplane 120 may include one or more waveguide layers that include multiple waveguides 122. In some embodiments, one waveguide layer may include routing waveguides for optically connecting PIC dies 112 and another waveguide layer may include delay lines. In general, it is desirable that the loss of waveguides 122 be as low as possible. In the illustrated example, light from an optical fiber 150 or a PIC die 112 may be coupled into a waveguide 122. The light may propagate in waveguide 122 and may be coupled into PIC dies 112 by a waveguide coupler 116. In some embodiments, the light signals may also be coupled into waveguides in different waveguide layers in optical backplane 120. In some embodiments, light may also be coupled from a PIC die 112 to a waveguide 122 in optical backplane 120 by a waveguide coupler 116, and may then be coupled from waveguide 122 to another PIC die 112 by another waveguide coupler 116. Thus, waveguides 122 may be used for light signal routing, layer-to-layer transition, delaying single photons, delaying or storing qubits, and the like. In some embodiments, optical backplane 120 may also include certain photonic circuits, such as dispersion compensators, polarization beam splitters/rotators, scatter mitigation structures, thermal management and local cooling structures, and the like.

As described above, PIC dies 112 may include various photonic circuit components, such as low-loss waveguides, delay lines, couplers, phase shifters, switches, single photon detectors, splitters, filters, and bright light (e.g., Ge photodiode-based) photon detectors integrated on a same wafer or in a same die. The photonic integrated circuit may also include other structures, such as heating or cooling structures, temperature sensors, and thermal and/or optical isolation structures, for controlling and/or improving the performance of certain photonic components. The PIC may also include quantum computing circuits, such as single photon generation circuits, resource state generation circuits, logic qubit detection circuits, and the like. Integrating these different types of devices and structures in a same PIC die, package, or module using semiconductor processing techniques such that thousands or millions of photonic circuit components can be reliably and efficiently manufactured and integrated into a die or a wafer using existing processing techniques remains a challenging task. For example, it can be difficult to make low-loss SiN waveguides in PIC dies 112 that includes active photonic integrated circuits because the high temperature (e.g., >1000° C.) and long-time annealing used to reduce H—N and Si—H bonds in SiN thereby reducing the loss of the SiN waveguides may degrade the performance of some active photonic integrated circuits.

Figure 2:
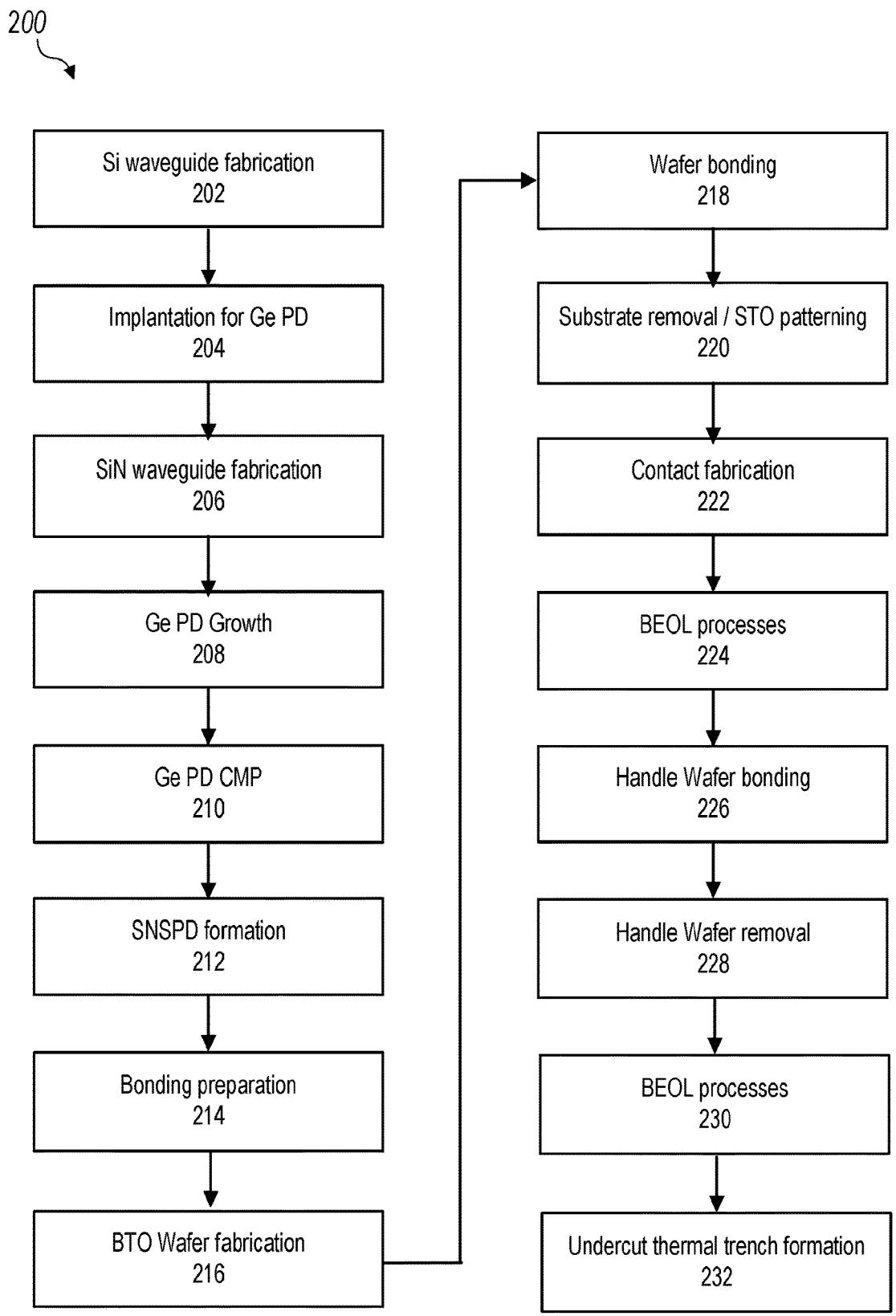
FIG. 2 is a simplified flow chart illustrating an example of a process for integrating various photonic circuit components in a PIC wafer according to certain embodiments.

FIG. 2 includes a simplified flowchart illustrating an example of a process 200 for integrating various photonic circuit components in a PIC wafer according to certain embodiments. It should be appreciated that the specific steps illustrated in FIG. 2 provide a particular method of integrating photonic circuit components in a same die or a same wafer. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. For example, one or more etch stop layers may be deposited on various material layers to prevent the underlying material layers from being etched. One of ordinary skill in the art would recognize many variations, modifications, and alternatives.

At operation 202 of process 200, silicon waveguides and some other silicon structures may be fabricated on a first wafer (a silicon wafer) using, for example, deposition and photolithography processes. For example, the surface of the silicon wafer may be oxidized to form a buried oxide (BOX) layer, which may function as an insulator layer. A silicon layer may be deposited on the BOX layer and may be etched to form, for example, the cores of silicon waveguides, such as buried waveguides or ridge waveguides. Other structures, such as silicon grating couplers and silicon regions for Ge photodiodes, may also be fabricated in the silicon layer that includes the silicon waveguides. In some embodiments, the silicon layer may also include a temperature measurement structure, such as a silicon-based temperature sensor.

Optionally, at operation 204, the silicon regions for Ge Photodiodes may be p-doped, for example, by ion implantation, to form the p region for the Ge photodiode. The p-doped region may include a heavily doped p++ region. In some embodiments, the temperature measurement structure may also be doped to form a temperature sensor. In some embodiments, a contact-etching stop-layer (e.g., a SiCN layer) for the temperature measurement structure and other structures may be formed.

At operation 206, oxide layers may be deposited on the silicon waveguide layer, and one or more SiN layers may be formed in the oxide layers. Silicon nitride waveguides may be formed in the SiN layers. For example, buried SiN waveguides may be formed in the SiN layers by patterning the SiN layers. The SiN waveguides in different SiN layers may have different thicknesses and different loss or light attenuation. For example, some SiN waveguides may have a higher thickness (e.g., about 800 nm) and a low loss, and thus may be used to implement long delay lines. Some SiN waveguide may have a lower thickness (e.g., about 350 nm or 250 nm), and may be used to make many other photonic circuit components, such as splitters, single photon generators, filters, and the like. In some examples, some SiN waveguides may have a loss, for example, between about 0.03 dB/m and about 2 dB/m, between about 0.04 dB/m and about 1 dB/m, or between about 0.05 dB and about 0.5 dB/m. In some embodiments, the SiN waveguides may have a loss lower than about 0.5 dB/m, lower than about 0.4 dB/m, lower than 0.3 dB/m, or lower than 0.1 dB/m. The low-loss SiN waveguides can be made at high temperature and/or through high-temperature (e.g., >1000° C.) annealing to reduce the loss of the waveguides. Because no active photonic integrated circuits may have been fabricated on the first wafer yet, the high-temperature processes, such as high-temperature annealing, may be performed to make the low-loss SiN waveguide, without degrading the performance of some active photonic integrated circuits that may be fabricated after fabricating the low-loss SiN waveguide. In some embodiments, the low-loss SiN waveguides may include optical delay lines of various time delays, such as greater than about 10-100 ps, greater than about 1 ns, or greater than about 50 ns. In some embodiments, the low-loss SiN waveguides may include pairs of waveguides for implementing and transporting qubits or entangled states of qubits.

Optionally, at operation 208, the oxide layers may be etched to expose the p-doped region, and a Ge material may be deposited onto the p-doped region and in the trenches etched in the oxide layers. At operation 210, the surface with the overburden of the deposited Ge material may be planarized by, for example, chemical mechanical polishing (CMP). A portion of the deposited Ge region may be n-doped to form an n+ region. Thus, a Ge photodiode may be formed by the n+ region, the deposited region, and the p-doped region.

At operation 212, superconductive nanowire single photon detectors (SNSPDs) may be fabricated, for example, on top of a SiN layer. The SNSPDs may include, for example, waveguides, a superconductive material layer, one or more protection layers, and/or a resist layer. In some embodiments, the superconductive material layer may include a niobium-based superconductive nanowire, such as a thin-film (e.g., with a thickness less than 100 nm, 50 nm, or 20 nm) of niobium germanium, niobium nitride, or niobium titanium nitride. Light incident on the superconductive material in a superconducting state may cause the superconductive nanowire to transition to a non-superconducting state. The protection layer may include a passivation layer comprising, for example, an amorphous silicon or a dielectric layer, such as an aluminum nitride (AlN) layer, to inhibit the oxidation of the superconductive material. An SNSPD contact regions for reading out the detection results of the SNSPDs may also be fabricated with the SNSPDs.

At operation 214, oxide layers may be deposited on the SNSPDs, and a planarization (e.g., CMP) process may be performed to planarize the surface for bonding with a second wafer that has an oxide layer at the surface. The oxide surface may also be cleaned or otherwise treated or pre-conditioned for bonding.

At operation 216, electro-optic switches, such as $BaTiO_3$-based optical switches or other high Pockels coefficient switches, may be fabricated on a second wafer. The switches may include, for example, electrically controllable phase shifters/modulators arranged to form an interferometer (e.g., a Mach-Zehnder interferometer). In one example, a second silicon wafer may be oxidized to form an oxide layer, and patterned $SrTiO_3$ (STO) and $BaTiO_3$ (BTO) layers may be formed on the oxide layer to form a phase shifter, where a ridge waveguide may be formed in the BTO layer. In another example, the phase shifter may include a BTO layer and a SiN ridge waveguide on the BTO layer. Oxide layers may be deposited on the $BaTiO_3$-based optical phase shifters that include patterned $SrTiO_3$ and $BaTiO_3$ layers or patterned BTO and SiN layer. The second wafer with the electro-optic switches buried in oxide layers may then be planarized by, for example, CMP, and cleaned or otherwise treated to prepare for bonding with the first wafer prepared by operations 202-214.

At operation 218, the second wafer prepared at operation 216 may be bonded to the first wafer prepared at operations 202-214 to form a wafer stack, where the oxide surface prepared at operation 214 may be bonded to the oxide surface prepared at operation 216 through, for example, oxide-oxide thermocompression direct bonding.

At operation 220, the second wafer of the wafer stack may be, for example, back grinded, back lapped, laser lifted, or etched, to remove the silicon substrate of the second wafer and expose the oxide layer of the second wafer. A portion of the patterned STO layer may then be removed by etching through the exposed oxide layer to form the BTO phase shifters and switch structures.

At operation 222, metal contacts for the BTO phase shifters, single photon detectors, Ge photodiodes, temperature sensors, and the like, may be formed in the oxide layers to make electrical connections with these devices through the oxide layers. For example, the oxide layer may be selectively etched to expose certain contact regions for these devices, and metal (e.g., tungsten or copper) plugs or vias may be formed in the openings and contact the exposed contact regions.

At operation 224, back end of line (BEOL) processes may be performed to form one or more metal layers for electrical interconnects, such as metal-1 layer, metal-2 layer, other metal layers, vias connecting the metal layers, and the like. In some embodiments, the metal layers may be used to form scatter mitigation structures around the single photon detectors and/or the grating couplers as described above. Various etch stop layers (e.g., SiCN layers) may be formed and used to pattern the metal layers and vias. In some embodiments, optical waveguides, such as SiN waveguides, may be formed in the oxide layers on or between the metal layers. The top surface of the oxide layers may be planarized and cleaned (or otherwise treated) for bonding.

At operation 226, a third wafer (e.g., a silicon handle wafer) with an oxide layer formed thereon may be bonded to the first wafer with the photonic integrated circuits formed by operations 202-224. The oxide layer on the third wafer and the exposed oxide layer on the first wafer may be bonded together by, for example, oxide-oxide thermocompression direct bonding as described above.

At operation 228, the substrate of the first wafer may be removed (e.g., through back grinding, back lapping, laser lifting, or etching) to expose the BOX layer on the first wafer.

At operation 230, back end of line processes may be performed from the side of the BOX layer to form one or more metal layers, vias, contact pads, or other electrical interconnects, on the BOX layer. Metal vias, plugs, or trenches may be formed in oxide layers to connect the metal layers on the BOX layer with other metal layers under the BOX layers, such as the metal layers formed by operation 224. The metal layers and the metal vias, plugs, or trenches may from scatter mitigation structures around, for example, the SNSPDs. In some embodiments, heaters, such as TiN heaters, may be formed on top of the BOX layer. As described above, the heaters may be used to, for example, tuning some photonic circuits, such as the phase delay of a waveguide in a phase shifter.

Optionally, at operation 232, the wafer stack may be etched (e.g., dry etched) or drilled from the top to the substrate of the third wafer to form trenches in the oxide layers. Selective wet etching may then be performed through the trenches to etch the silicon in the substrate of the third wafer and form undercut regions in the substrate under some photonic circuits, in order to thermally isolate the photonic circuits from other circuits. In some embodiments, the trenches may be at least partially filled with an oxide or another material.

As described above, the PIC wafer made by operations 202-232 may then be bonded with an EIC wafer to form an EPIC wafer stack that can be diced and bonded to a substrate, a handle wafer, or an optical interposer to form a quantum computing module.

Figure 3G:
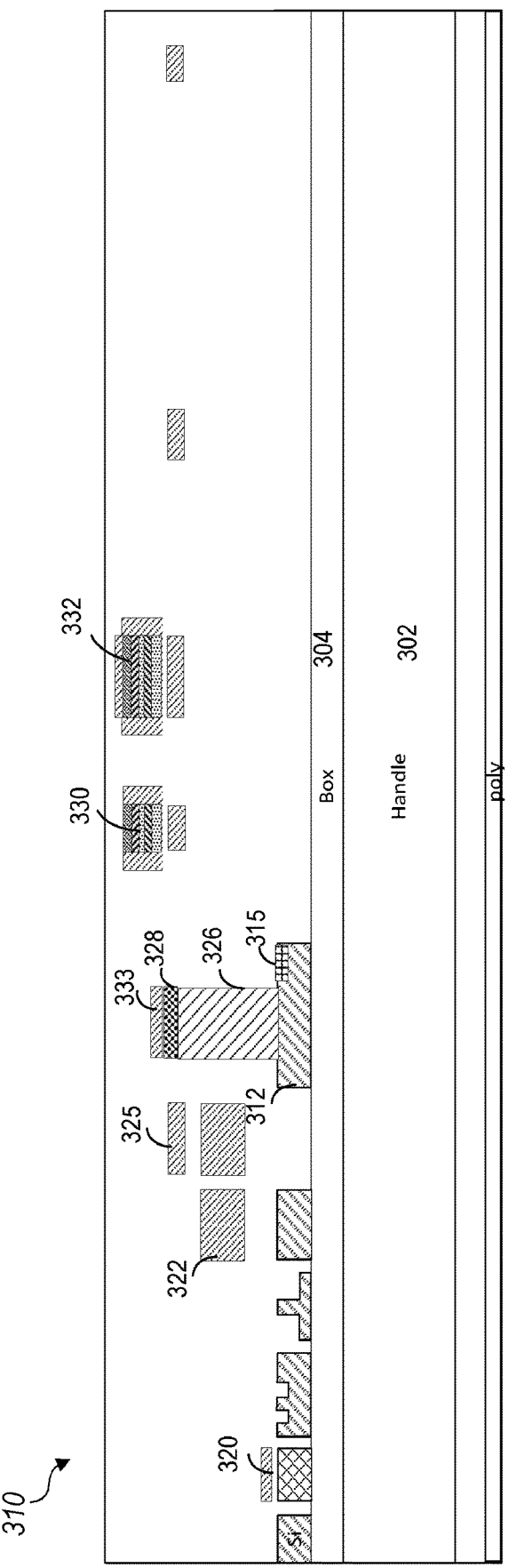
FIGS. 3A-3P illustrate an example of a process for integrating various photonic circuit components in a PIC wafer according to certain embodiments.
Figure 3H:
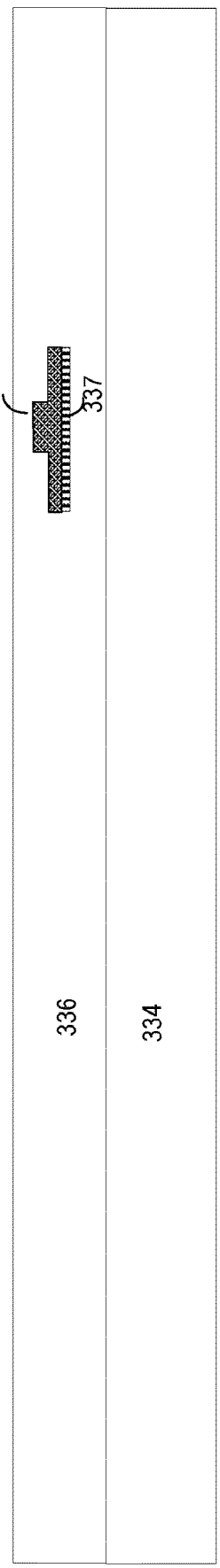
Figure 3I:
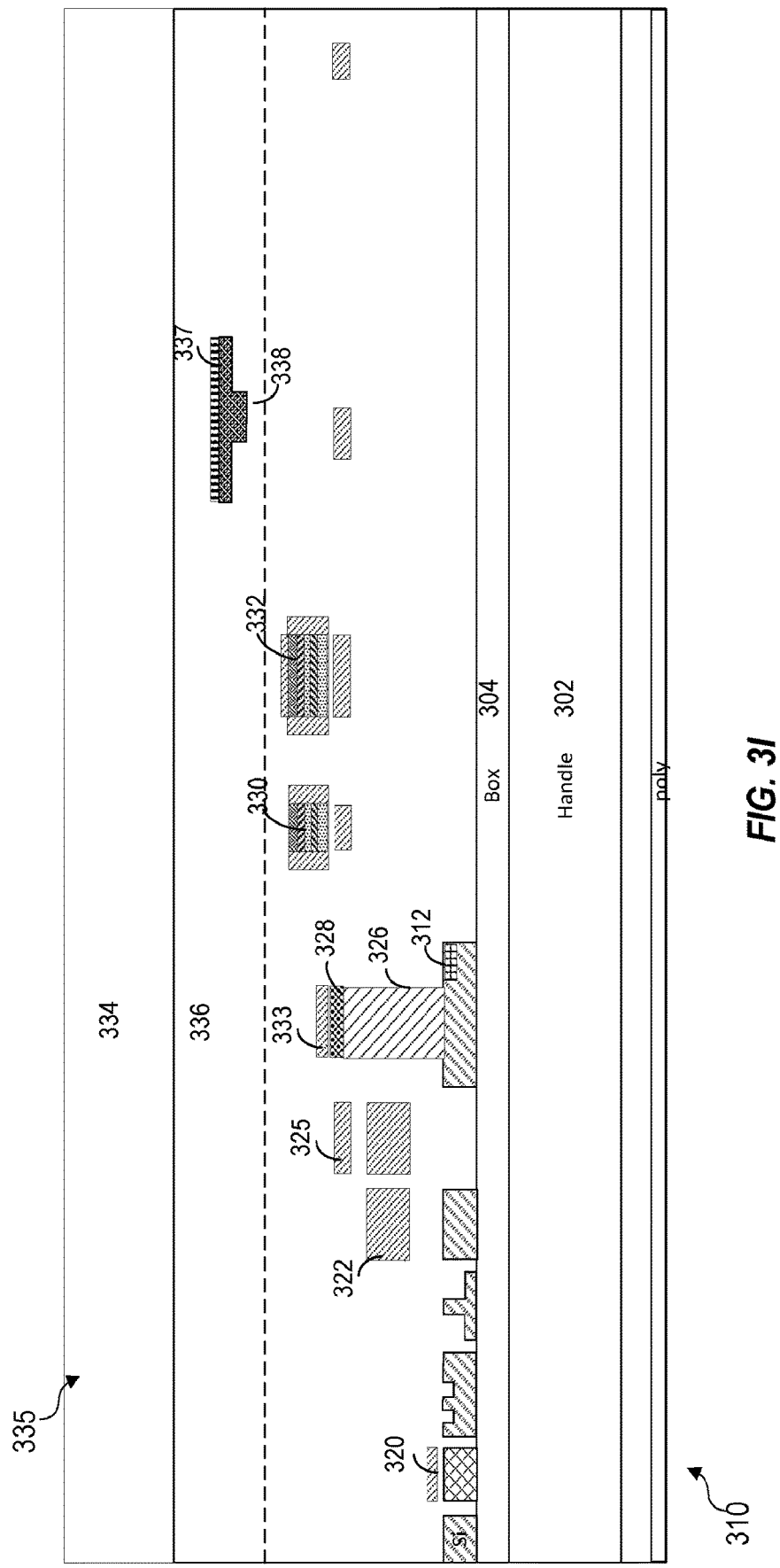
Figure 3L:
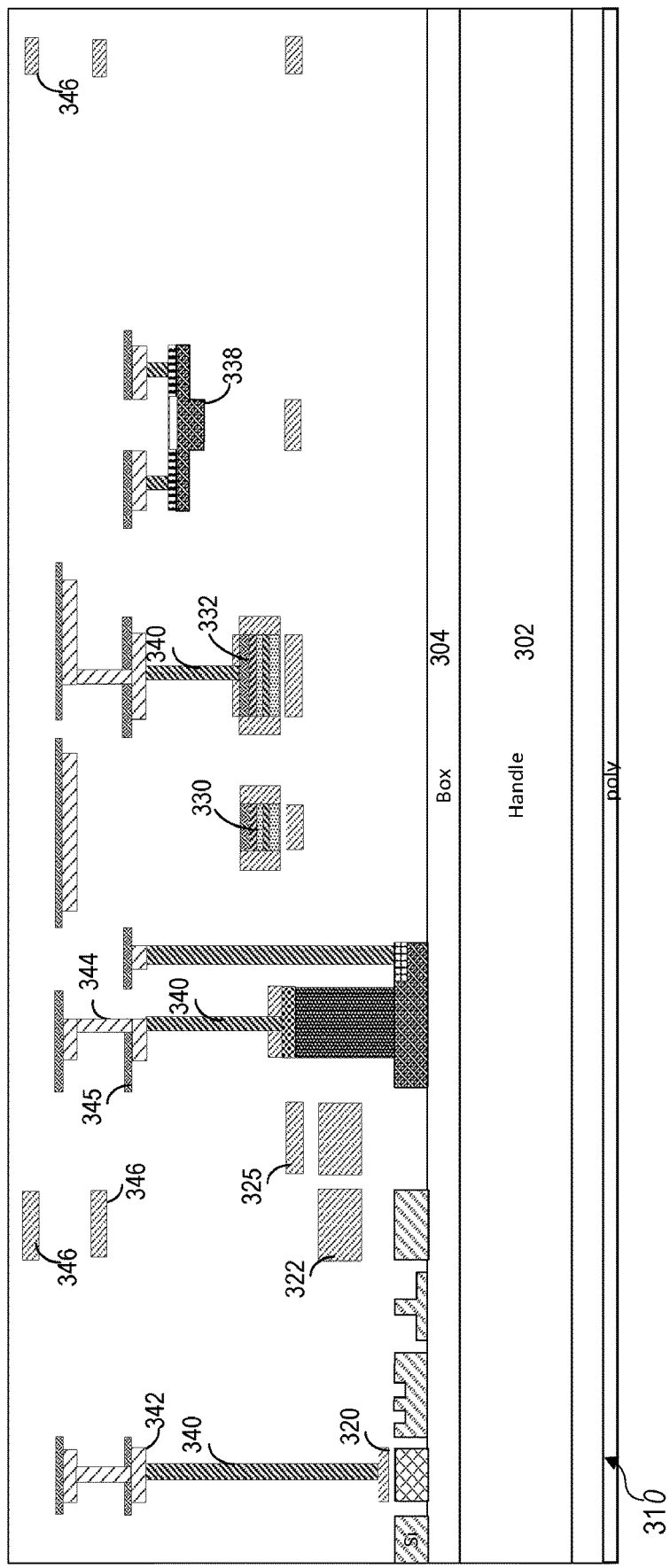
Figure 3M:
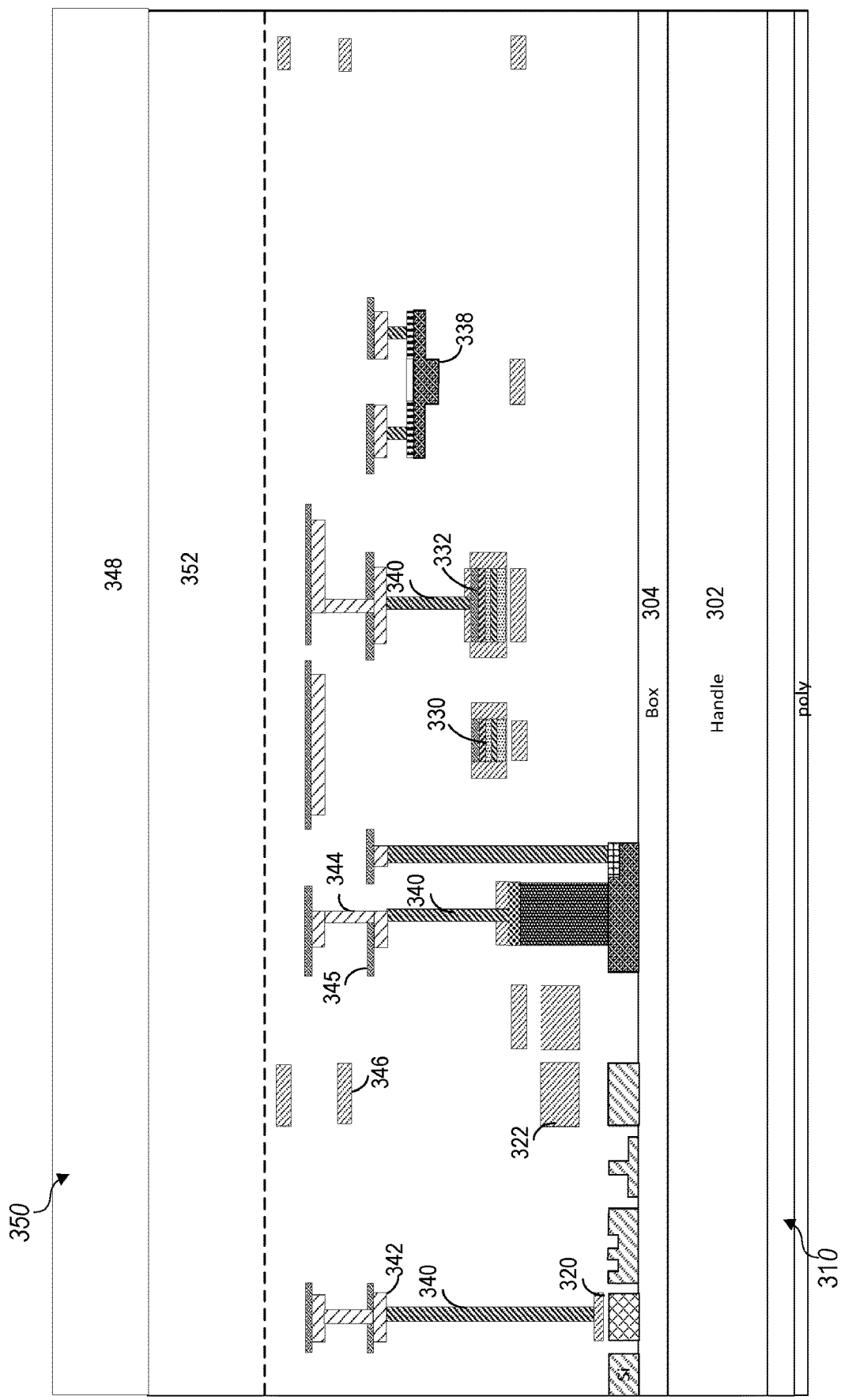
Figure 3N:
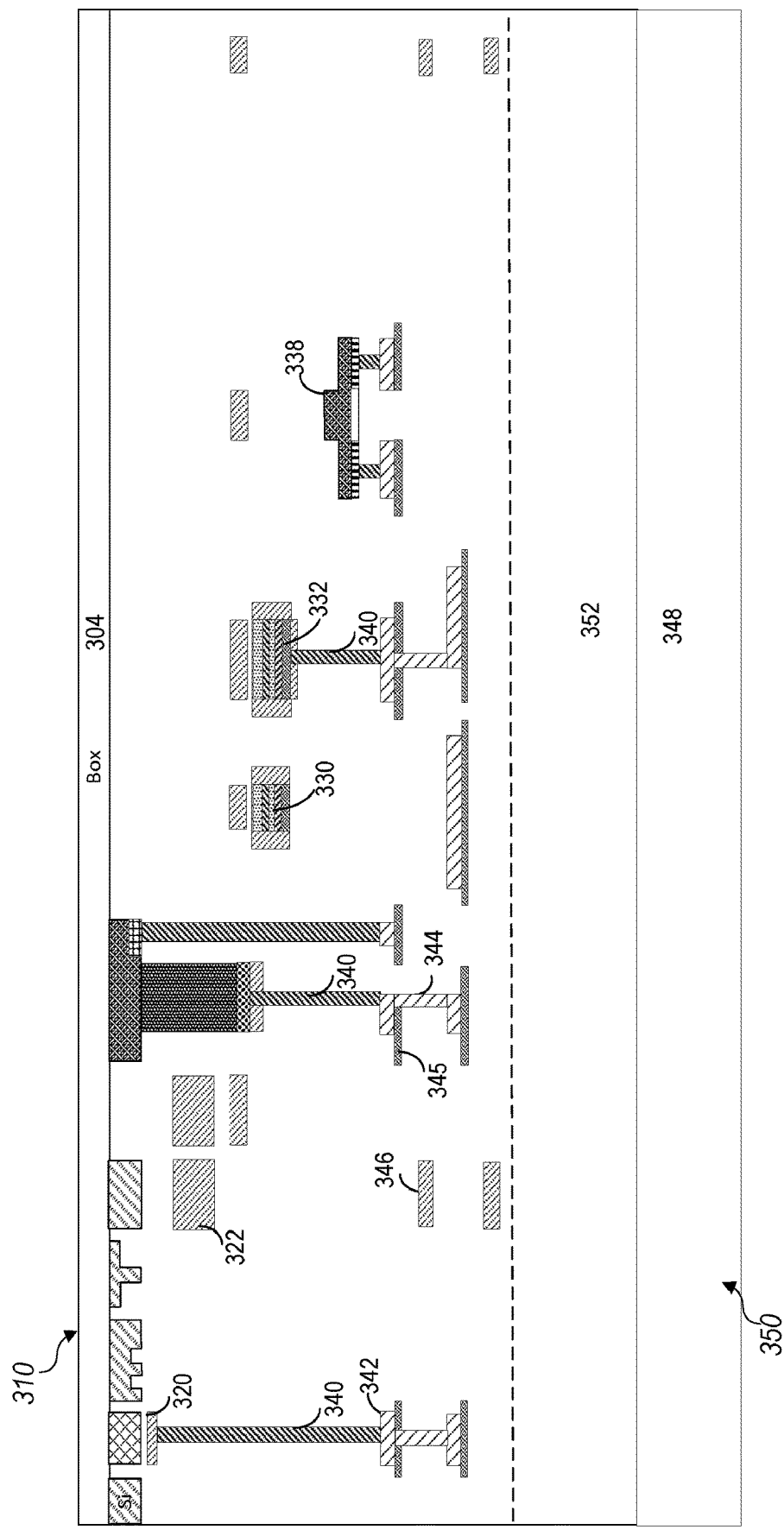
Figure 3O:
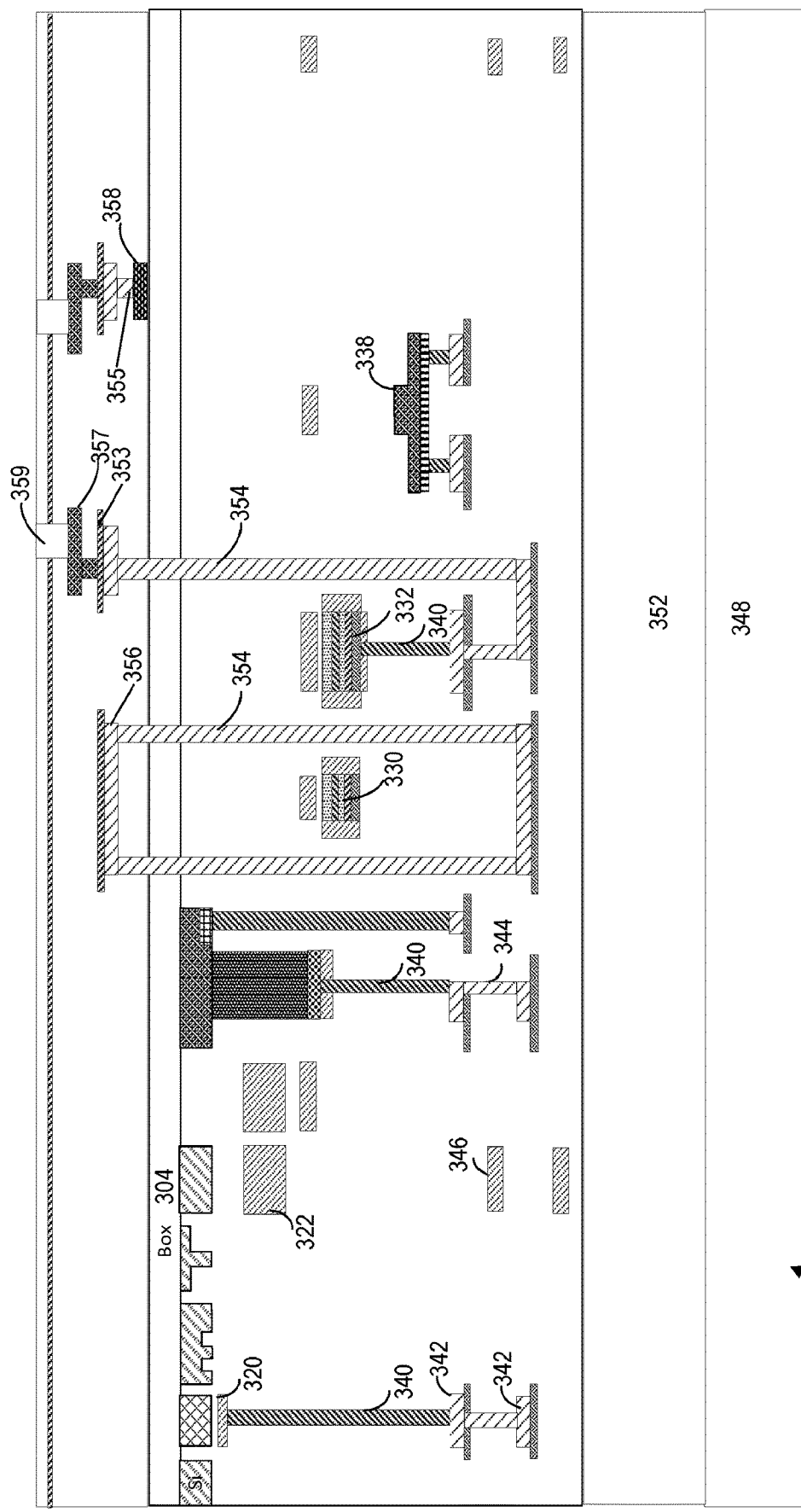
Figure 3P:
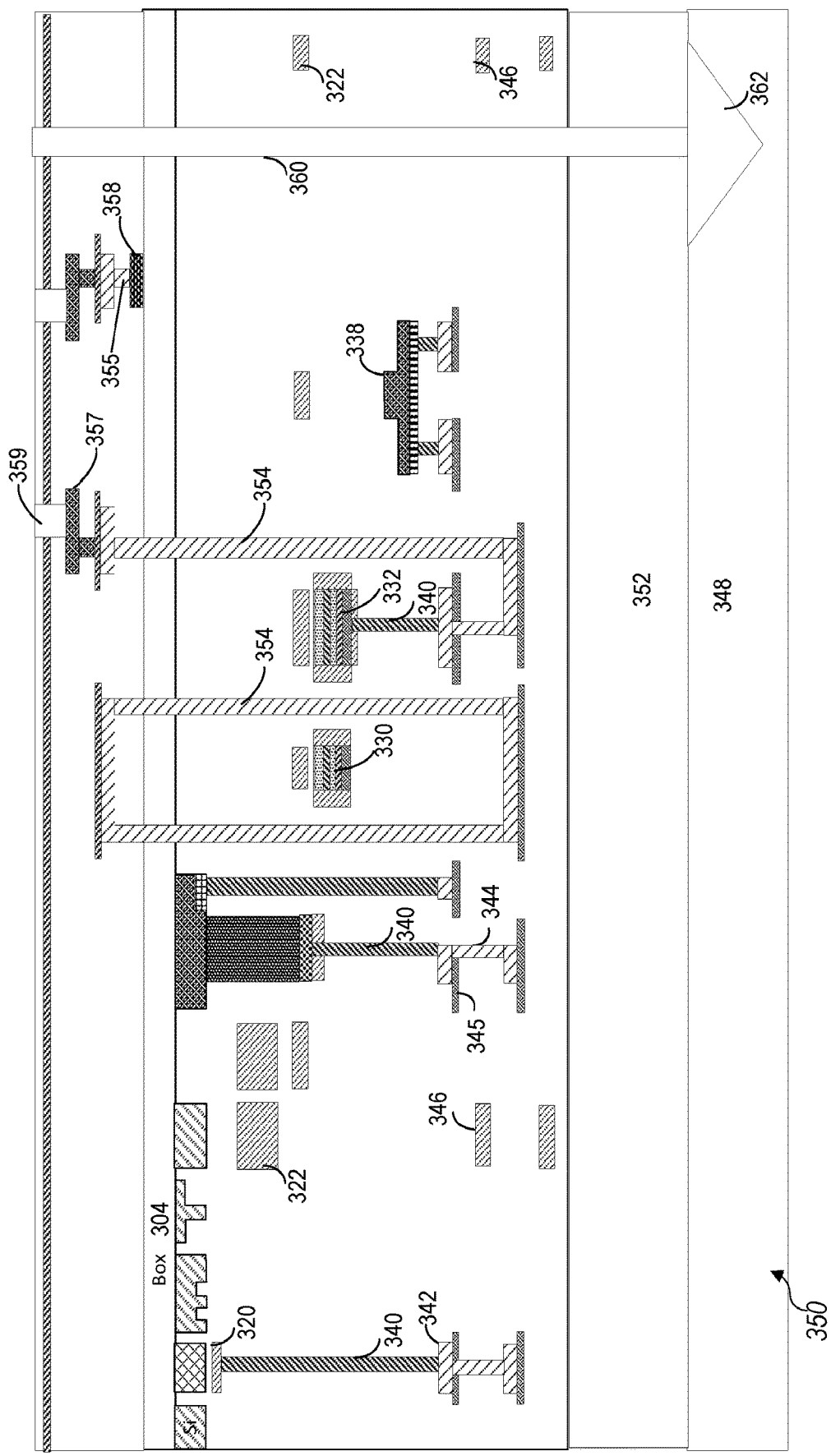

FIGS. 3A-3P illustrate an example of a process (e.g., described above with respect to FIG. 2) for integrating various photonic circuit components in a PIC wafer according to certain embodiments. FIG. 3A shows a first wafer 310 made by operation 202. The first wafer may include a substrate 302, a BOX layer 304, various silicon structures form in a silicon-on-insulator (SOI) layer. The silicon structures may include, for example, a waveguide 308, a structure 312 for a Ge photodiode, a temperature measurement structure 314, a grating coupler 316, a ridge waveguide 318, and the like. An oxide layer 306 may then be deposited on the SOI layer and planarized.

FIG. 3B shows that structure 312 is p-doped in operation 204. The p-dope structure 312 may be used as the p region for the Ge photodiode. In the illustrated example, structure 312 may include a p++ region 315. In some embodiments, temperature measurement structure 314 may also be doped in order to form a temperature sensor.

FIG. 3C illustrates oxide layers 324 deposited on the SOI layer, and one or more SiN waveguides 322 and 325 formed on one or more SiN layers in oxide layers 324 after operation 206. SiN waveguides 322 and 325 may include buried SiN waveguides of various sizes, such as different thicknesses (heights), widths, and lengths, and different losses or light attenuation. For example, SiN waveguides 322 may have a higher thickness and a lower loss than SiN waveguide 325. As described above, SiN waveguides 322 and/or 325 may be made at an elevated temperature or through a high-temperature (e.g., >1000° C.) annealing and may have a low loss, for example, lower than about 0.5 dB/m, lower than about 0.4 dB/m, lower than 0.3 dB/m, or lower than 0.1 dB/m. In some embodiments, SiN waveguides 322 may include optical delay lines of various time delays, such as greater than about 10-100 ps, greater than about 1 ns, or greater than about 50 ns. In some embodiments, SiN waveguides 322 and/or 325 may include pairs of waveguides for implementing and transporting qubits or entangled states of qubits. FIG. 3C also shows an etch stop 320 formed on temperature measurement structure 314.

FIG. 3D illustrates that oxide layers 324 may be etched to expose the p-doped region of structure 312, and a Ge material 326 may be deposited on the exposed p-doped region and in the trenches etched in oxide layers 324 after operation 208.

FIG. 3E shows that the surface of first wafer 310 with the overburden of the deposited Ge material 326 may be planarized by, for example, a CMP process at operation 210. A region 328 of Ge material 326 may be n-doped to form an n+ region 328. Thus, a Ge photodiode may be formed by the n+ region (e.g., region 328), the deposited region (Ge material 326), and the p-doped region (structure 312).

FIG. 3F shows single photon detectors 330 (e.g., SNSPDs) and SNSPD contact regions 332 formed on the planarized surface of first wafer 310 after operation 212. As described above, the SNSPDs and SNSPD contact regions may include multiple layers, such as a waveguide layer (e.g., the silicon nitride waveguides formed at operation 206), a superconductive material layer (e.g. a niobium-based superconductive nanowire), one or more protection or passivation layers, and/or a resist layer. FIG. 3F also shows an etch stop 333 formed on top of the Ge photodiode.

FIG. 3G shows that oxide layers may be deposited on the SNSPDs and a CMP process may be performed to planarize the surface of first wafer 310 at operation 214. The surface of first wafer 310 may be further treated (e.g., cleaned and/or surface activated) for bonding with another wafer that may also have an oxide layer at the surface.

FIG. 3H shows an electrically tunable phase shifter, such as a BTO phase shifter 338 of an electro-optic switch, formed on a second wafer 335 (e.g., a silicon wafer) after operation 216. In the illustrated example, second wafer 335 may include a substrate 334, oxide layers 336, and patterned SrTiO₃ (STO) layer 337 and a BaTiO₃ (BTO) ridge waveguide formed in the oxide layers. As described above, in some other embodiments, BTO phase shifter 338 may include a SiN ridge waveguide formed in a BTO layer. Oxide layers may be deposited on the STO/BTO layers and may then be planarized by, for example, a CMP process, and mat be preconditioned (e.g., cleaned and/or surface activated) for bonding.

FIG. 3I shows a wafer stack including second wafer 335 bonded to first wafer 310 after operation 218, where the oxide surface prepared at operation 214 may be bonded to the oxide surface prepared at operation 216 through, for example, oxide-oxide thermocompression direct bonding.

FIG. 3J shows that substrate 334 of second wafer 335 may be removed after operation 220 to expose oxide layers 336. A portion of the patterned STO layer 337 for BTO phase shifter 338 may be removed by etching through oxide layers 336 to form BTO phase shifter 338.

FIG. 3K shows that, after operation 222, metal contacts 340 for BTO phase shifter 338, single photon detector 330, the Ge photodiode, the temperature sensor, and the like, are formed in the oxide layers of the wafer stack to make electrical connections with these devices. Metal contacts 340 may include a metal, such as tungsten or copper.

FIG. 3L shows that back end of line (BEOL) processes as described with respect to operation 224 are performed to from one or more metal layers 342 for electrical interconnects (e.g., metal-1 layer and metal-2 layer), vias 344 for connecting the metal layers, and the like. Various etch stop layers 345 (e.g., SiCN layers) may be used to pattern metal layers 342 and vias 344. In some embodiments, metal layers 342 may be used to form scatter mitigation structures around the single photon detectors 330 and/or the input grating couplers as described above. In the illustrated example, waveguides 346, such as SiN waveguides, are formed in the oxide layers on or between metal layers 342. In some embodiments, waveguides 346 at the edge of a PIC die may be used as a grating coupler to couple light into a waveguide. The top surface of the oxide layers is planarized and treated (e.g., cleaned and/or activated) for bonding.

FIG. 3M shows a third wafer 350 bonded to first wafer 310 with photonic integrated circuits formed thereon. Third wafer 350 may include a substrate 348 (e.g., a silicon substrate) with an oxide layer 352 formed thereon. As illustrated, oxide layer 352 on third wafer 350 and the oxide layer on the surface of first wafer 310 may be bonded together, for example, by oxide-oxide thermocompression direct bonding at operation 226.

FIG. 3N shows that substrate 302 of first wafer 310 may be removed (e.g., through back grinding, back lapping, laser lifting, or etching) at operation 228 to expose BOX layer 304.

FIG. 3O shows one or more metal layers 356, vias 355, contact pads 357, or other electrical interconnects formed on BOX layer 304 by the back end of line processes at operation 230. Metal plugs 354 (or vias or trenches) may be formed in the oxide layers to connect metal layers 356 with other metal layers, such as metal layers 342. As illustrated in the example, metal layers 342 and 356 and metal plugs 354 may from scatter mitigation structures around, for example, single photon detector 330 to prevent stray light from reaching single photon detector 330. FIG. 3O also shows a TiN heater 358 formed on top of BOX layer 304. Trenches 359 may be formed in oxide layers, and may be used to form bonding balls (not shown in FIG. 3O) on contact pads 357. One or more etch stop layers 353 (e.g., SiCN layers) may be used to pattern metal layers 356 and vias 355.

FIG. 3P shows an undercut region 362 formed in substrate 348 after operation 232. As described above, undercut region 362 may be formed by etching or drilling the oxide from the top down to substrate 348 of third wafer 350 to form trenches 360 in the oxide, and selectively wet-etching substrate 348 through trenches 360 to remove silicon in substrate 348 under some photonic circuits. Even though the undercut region 362 in the example shown in FIG. 3P includes a small region, the undercut region 362 in various embodiments can have a much larger area, such as an area aligned with or wider than the region of the photonic circuits to be thermally isolated. In some embodiments, trenches 360 and undercut regions 362 may be at least partially filled with an oxide or another material. FIG. 3P also show multiple waveguides 346 and 322, which may be used as an edge coupler (e.g., grating coupler) to couple light into one or more waveguides.

The structure shown in FIG. 3P includes various passive and active photonic components in a same die stack or a same wafer stack, such as silicon waveguides, low-loss SiN waveguides that form parts of other passive or active photonic components (e.g., splitters, filters, and delay lines), grating couplers, Ge photodetectors, single photon detectors, low power BTO phase shifters/switches, temperature sensors, heaters, and the like. Thus, the structure may perform various functions for optical quantum computing, such as single photon generation, photon entanglement, qubit storage, single-photon and multi-photon measurement, data communication, and the like. The structure also includes thermal isolation structures (e.g., undercut regions 362 and trenches 360) for thermally isolating, for example, the heaters from other components. Undercut regions 362 can be formed in a large region in substrate 348 to thermally isolate components in a large region. The structure further includes scattered light mitigation structures formed by metal layers and through-oxide vias to isolate, for example, the single photon detectors, from stray light.

Processes described above may be modified to fabricate photonic integrated circuits with various passive and active photonic integrated circuit components in a layer stack different from the layer stack shown in FIG. 3P. For example, the metal layers may be on a same side of the various photonic integrated circuit components. Some components, such as the Ge photodiodes, may not be used in some photonic integrated circuits. The thermal isolation structures, if used, may be made before the metal layers are formed, and/or may be made in different manners.

Figure 4:
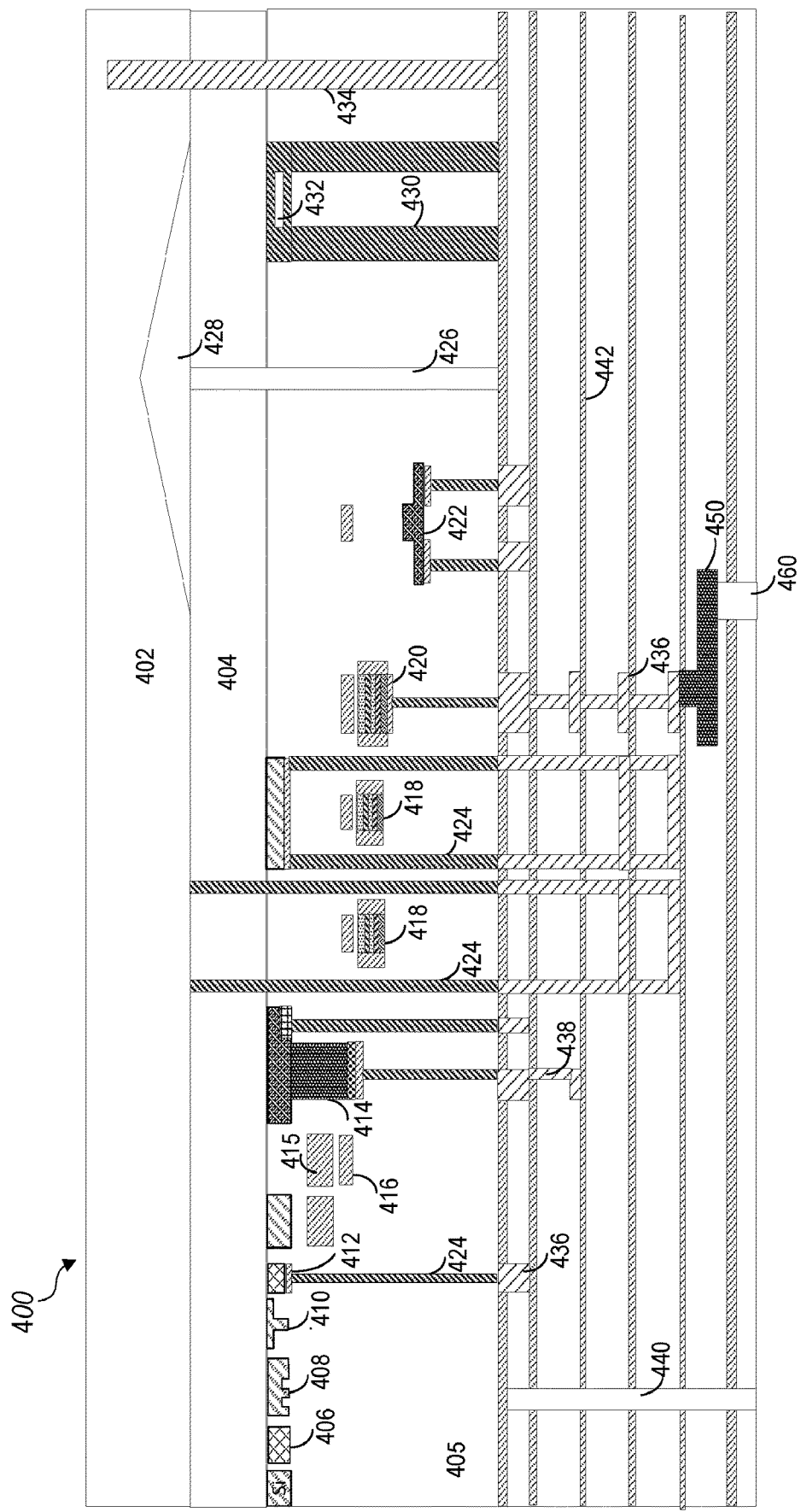
FIG. 4 illustrates an example of a PIC wafer including various photonic circuit components according to certain embodiments.

FIG. 4 illustrates another example of a PIC wafer 400 including various photonic integrated circuit components according to certain embodiments. In the illustrated example, PIC wafer 400 includes a substrate 402, a BOX layer 404, a temperature sensor 406, a grating coupler 408, a ridge waveguide 410, a heater 412, a Ge photodiode 414, one or more layers of SiN waveguides 415 and 416, one or more SNSPDs 418, SNSPD contact regions 420, and the like. As described above, the silicon-based circuit components, such as grating coupler 408, a ridge waveguide 410, temperature sensor 406, and the like, may be formed in an SOI layer deposited on BOX layer 404. SiN waveguides 415 and 416 may have different thicknesses and different losses, and may be used to form various active and passive photonic integrated circuit components, such as delay lines, phase shifters, ring oscillator, interferometers, switches, filters, single photon detectors, couplers, and the like. SiN waveguides 415 and 416 may receive light from an optical fiber through edge coupling or grating coupler 408. These devices may be fabricated on a same wafer as described above with respect to operations 202-214 and FIGS. 3A-3G. Heater 412 may include, for example, a silicide layer (such as a nickel silicide layer), a nitride layer (e.g., TiN or NbN), or another resistive material layer, and may be used to tune silicon waveguides. The silicide layer may also be formed in other regions, such as on top of a silicon material region in the SOI layer below SNSPD 418, to form part of a scatter mitigation structure.

The wafer with these devices and structures may be bonded with a wafer with phase shifters 422 for BTO switches formed thereon as described above with respect to operations 216 and 218 and FIGS. 3H and 3I. The substrate of the wafer with phase shifters 422 may subsequently be removed and the STO layer of phase shifters 422 may be patterned by selective etching as described above with respect to operations 220 and FIG. 3J. Electrical contacts 424 (e.g., through-oxide vias) may be formed in the oxide layers to make electrical connections to the various devices, such as heater 412, Ge photodiode 414, SNSPDs 418, phase shifters 422, and the like. As illustrated in the example, electrical contacts 424 may include metal trenches surrounding SNSPDs 418 to form scatter mitigation structures for blocking stray light as described above.

As also illustrated in FIG. 4, thermal trenches 426 and undercut regions 428 may be formed in the oxide layers and substrate 402 respectively, as described above with respect to operation 232 and FIG. 3P. Additionally or alternatively, thermal isolation trenches 430 and undercut region 432 may be formed by, for example, etching trenches in the oxide layers to expose certain regions of the SOI layer, and then selectively etching the SOI layer to remove the silicon and form a undercut region. In some embodiments, other structures, such as metal trenches 434 may be formed in the oxide layers and the substrate.

After these structures are manufactured, PIC wafer 400 may be processed using the BEOL processes to form one or more metal layers 436 and vias 438 (e.g., metal plugs or metal trenches). Some vias 438 may be aligned with some electrical contacts 424 to form the scatter mitigation structures for SNSPDs 418. In some embodiments, a trench 440 aligned with grating coupler 408 may be etched in the oxide layer to facilitate the coupling of light into the waveguides. For example, an optical fiber may be inserted into trench 440 or positioned on trench 440 to send light to grating coupler 408.

As illustrated in FIG. 4, one or more etch stop layers 442 (e.g., SiCN layers) may be used as needed for etching and patterning the metal layers and other structures. The SiCN layers may also be passivation layers for the metal (e.g., copper) in the metal layers. Contact pads 450 may be formed on the top metal layer (bottom layer shown in FIG. 4) of PIC wafer 400. In the illustrated example, trenches 460 may be etched to from boning balls (not shown in FIG. 4) for bonding contact pads 450 with an EIC wafer as described above.

PIC wafer 400 shown in FIG. 4 incldues various passive and active photonic components in a same wafer stack, such as silicon waveguides, SiN waveguides that form parts of other passive or active photonic components (e.g., splitters, filters, delay lines, phase shifters, and single photon sources), grating couplers, Ge photodetectors, single photon detectors, low power BTO phase shifters/switches, temperature sensors, heaters, and the like. Thus, PIC wafer 400 may be used to perform various functions for optical quantum computing, such as single photon generation, photon entanglement, fusion, qubit storage, resource state generation, single-photon and multi-photon measurement, data communication, and the like. PIC wafer 400 also includes thermal isolation structures (e.g., undercut regions 428 and trenches 426) for thermally isolating, for example, the heaters from other components. Undercut regions 428 can be formed in a large region in substrate 402 to thermally isolate components in a large region. Undercut regions (e.g., undercut region 432) may additionally or alternatively be formed in an SOI layer. PIC wafer 400 further includes scattered light mitigation structures formed by metal layers, a silicide layer, and through-oxide vias or trenches, to isolate, for example, the single photon detectors from stray light.

Figure 5:
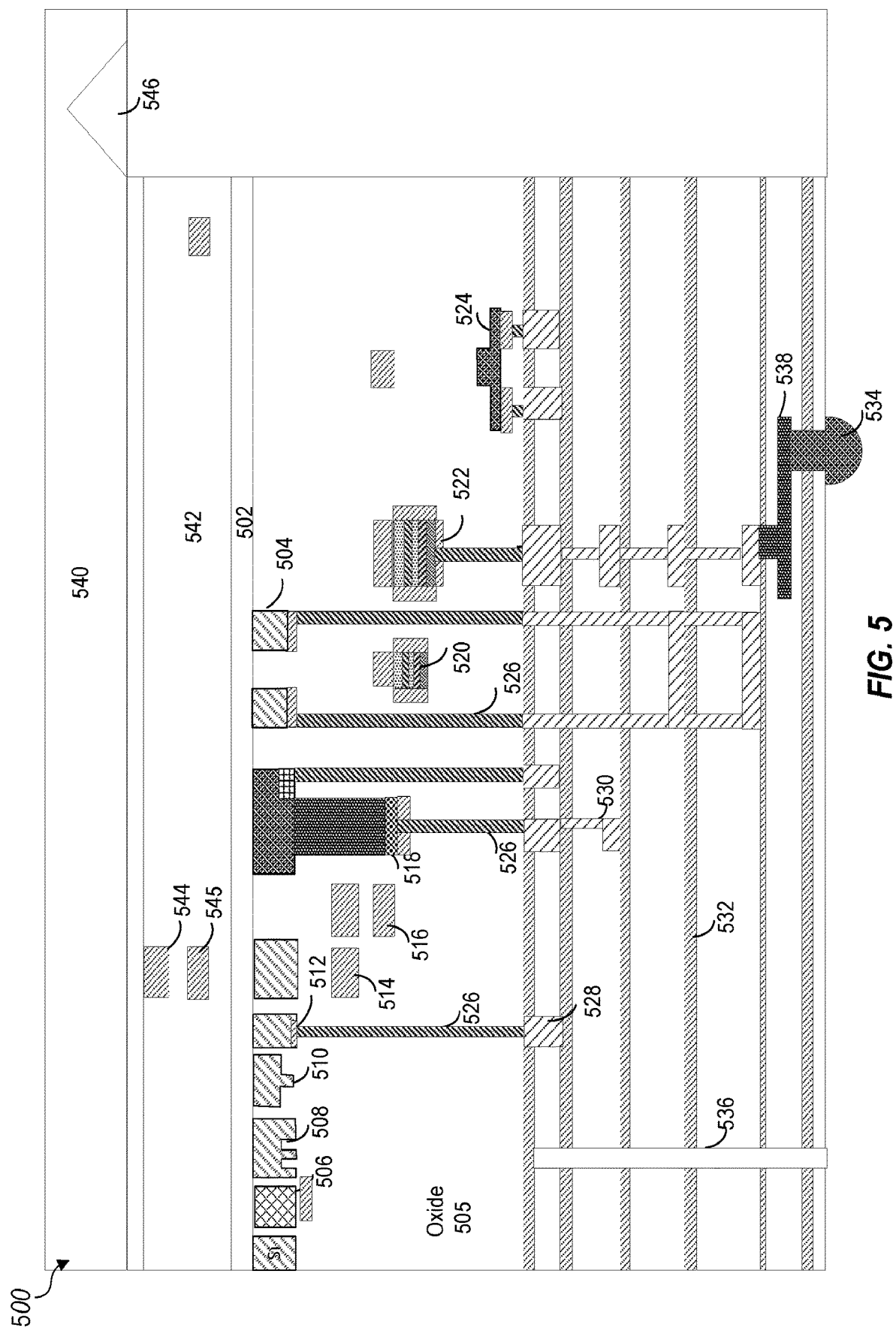
FIG. 5 illustrates an example of a PIC wafer including various photonic circuit components according to certain embodiments.

FIG. 5 illustrates another example of a PIC wafer 500 (or a PIC die) including various photonic circuit components according to certain embodiments. In the illustrated example, PIC wafer 500 includes a substrate 540 with an optical interposer 542 formed thereon. Optical interposer 542 may include SiN waveguides 544 and 5545 of different thicknesses and lengths for different purposes as described above. Some SiN waveguides 544 may have a very low loss and a long length, and may be used as delay lines or interconnects between PIC dies. Alignment structures, such as V-grooves 546 may be formed in substrate 540 and may be used to align optical fibers with some SiN waveguides 544 and 5445 to couple light into or out of optical interposer 542. In some embodiments, other portions of PIC wafer 500 may be bonded to optical interposer 542 and substrate 540 through wafer-to-wafer bonding or die-to-wafer bonding, or may be fabricated on optical interposer 542 through, for example, SOI processes.

In the illustrated example, PIC wafer 500 may include a BOX layer 502, a temperature sensor 506, a grating coupler 508, a silicon waveguide 510, a heater 512, a Ge photodiode 518, one or more layers of waveguides 514 and 516 (e.g., SiN waveguides), one or more SNSPDs 520, and SNSPD contact regions 522. As described above, temperature sensor 506, grating coupler 508, silicon waveguide 510, at least part of heater 512, and at least part of Ge photodiode 518 may be fabricated in a silicon layer, such as a SOI layer formed on BOX layer 502. Waveguides 514 and 516 may have different thicknesses and losses, and may be used to implement various photonic circuit components. For example, waveguides 514 may be used to make a delay line or a single photon source, and waveguides 516 may be used to implement some other photonic circuit components described above, such as a single photon detector or a phase shifter for a switch. In some embodiments, waveguides 514 and/or 516 may receive light from optical interposer 542 through, for example, a grating coupler. Heater 512 may include, for example, a silicide layer (such as a nickel silicide layer), a nitride layer (e.g., TiN or NbN), or another resistive material layer, and may be used to tune, for example, silicon waveguides. The silicide layer may also be formed in other regions, such as on silicon materials below SNSPD 520 to form part of a scatter mitigation structure to prevent stray light from reaching SNSPD 520. These devices may be fabricated on a same PIC wafer as described above with respect to operations 202-214 and FIGS. 3A-3G, where the substrate (not shown in FIG. 5) of the wafer may be removed before these devices are bonded to optical interposer 542. For example, the bonding with optical interposer 542 may be performed after the PIC wafer and an EIC wafer are bonded to form an EPIC wafer stack, the substrate for the PIC wafer are removed, and the EPIC die stacks are singulated. In some embodiments, these device may be fabricated on optical interposer 542 using SOI processes, rather than being bonded to optical interposer 542.

The PIC wafer with the above-described devices and structures may be bonded with a wafer with BTO phase shifters 524 (e.g., for a switch) formed thereon to form a wafer stack as described above with respect to operations 216 and 218 and FIGS. 3H and 3I. In some embodiments, the substrate of the PIC wafer may be removed after the bonding of the PIC wafer with the wafer with BTO phase shifters 524, the wafer stack may then be bonded to optical interposer 542 and substrate 540, and the substrate (not shown in FIG. 5) of the wafer with BTO phase shifters 524 may be removed subsequently. In some embodiments, the substrate of the PIC wafer may not be removed before the substrate of the wafer with BTO phase shifters 524 is removed, and may be removed after the BEOL processes are performed and the PIC wafer is bonded to an EIC wafer, before the EPIC wafer stack is bonded to optical interposer 542. In either case, after the substrate of the wafer with BTO phase shifters 524 is removed, the STO layer of BTO phase shifters 524 may be patterned by selective etching as described above with respect to operations 220 and FIG. 3J. Electrical contacts 526 (e.g., through-oxide vias or trenches) may be formed in the oxide layers to make electrical connections to the various devices, such as heater 512, Ge photodiode 518, SNSPD contact region 522, BTO phase shifter 524, and the like. As illustrated in the example, electrical contacts 526 may include metal trenches surrounding SNSPD 520 to form (in combination with the silicide layer and one or more metal layers) a scatter mitigation structure for blocking stray light as described above.

Even though not shown in FIG. 5, thermal isolation trenches and undercut regions may be formed by, for example, etching trenches in the oxide layers to expose certain regions of the SOI layer, and then selectively etching the SOI layer as described above with respect to thermal isolation trenches 430 and undercut regions 432.

After these structures are manufactured, the wafer may be processed using the BEOL processes to form one or more metal layers 528 and vias 530 (e.g., metal plugs or metal trenches). Some vias 530 may be aligned with some electrical contacts 526 to form the scatter mitigation structure for SNSPDs 520. In some embodiments, a trench 536 aligned with grating coupler 508 may be etched in the oxide layers to facilitate the coupling of light into the waveguides. For example, an optical fiber may be inserted into trench 536 or positioned on trench 536 to send light to grating coupler 508.

As illustrated in FIG. 5, one or more etch stop layers 532 (e.g., SiCN layers) may be used as needed for etching and patterning the metal layers and other structures. The SiCN layers may also be passivation layers for the metal (e.g., copper) in the metal layers. FIG. 5 also shows contact pads 538 (e.g., made of tungsten) and bonding bumps 534 formed on the top metal layer of the PIC wafer for bonding with an EIC wafer as described above.

In some embodiments, the PIC wafer including BOX layer 502 and other PIC components formed or bonded on BOX layer 502 (e.g., temperature sensor 506, grating coupler 508, silicon waveguide 510, heater 512, Ge photodiode 518, waveguides 514 and 516, SNSPD 520, BTO phase shifters 524, metal layers 528, etc.) may be bonded to an EIC using the bonding bumps 534 or bonding pads as described above to form an EPIC wafer stack, the substrate for the PIC wafer may be removed, and the EPIC die stacks may be diced and bonded to optical interposer 542. Electrical backplane devices, optical fibers, and/or an electrical interposer may also be attached or bonded as described above.

PIC wafer 500 shown in FIG. 5 includes various passive and active photonic components in a same wafer stack (or die stack), such as silicon waveguides, SiN waveguides that form parts of other passive or active photonic components (e.g., splitters, filters, and delay lines), grating couplers, Ge photodetectors, single photon detectors, low power BTO phase shifters/switches, temperature sensors, heaters, and the like. Thus, PIC wafer 500 may perform various functions for optical quantum computing, such as single photon generation, photon entanglement, fusion, qubit storage, resource state generation, single-photon and multi-photon measurement, data communication, and the like. PIC wafer 500 also includes an optical backplane (e.g., optical interposer 542) that may include low-loss waveguides and couplers for coupling light into or out of a PIC die, storing qubits, compensating dispersion, connecting PIC dies, and the like. PIC wafer 500 further includes scattered light mitigation structures formed by metal layers, a silicide layer, and through-oxide vias or trenches to isolate, for example, the single photon detectors from stray light.

As described above, in a photonic chip for linear optical quantum computing, single photons are emitted by a source, pass along waveguides through a range of linear optical elements, including delay lines (low-loss SiN waveguides described above), directional couplers, and active phase shifters (e.g., phase shifters 338, 422, and 524 described above) before being detected by a photon counting detector.

In some embodiments, qubit state initialization involves a single photon source. When the single photon source succeeds, it produces one and only one photon. The photons produced by each source are nearly identical; including frequency; pulse shape, and timing. In some embodiments, the source can produce photons at a very high repetition rate, e.g., around 1 GHz. A suitable photon generation technique includes spontaneous four-wave mixing to produce photon pairs probabilistically at mid-infrared frequencies close to the optical communication band, for example, using ring oscillators described above. One of the two photons is detected, producing an electrical signal that heralds the success of the source.

Since spontaneous four-wave mixing sources do not work with unit probability, it is desirable to multiplex them. By multiplexing multiple sources that operate with low probability it is possible to produce a single source that functions with high probability.

Figure 6:
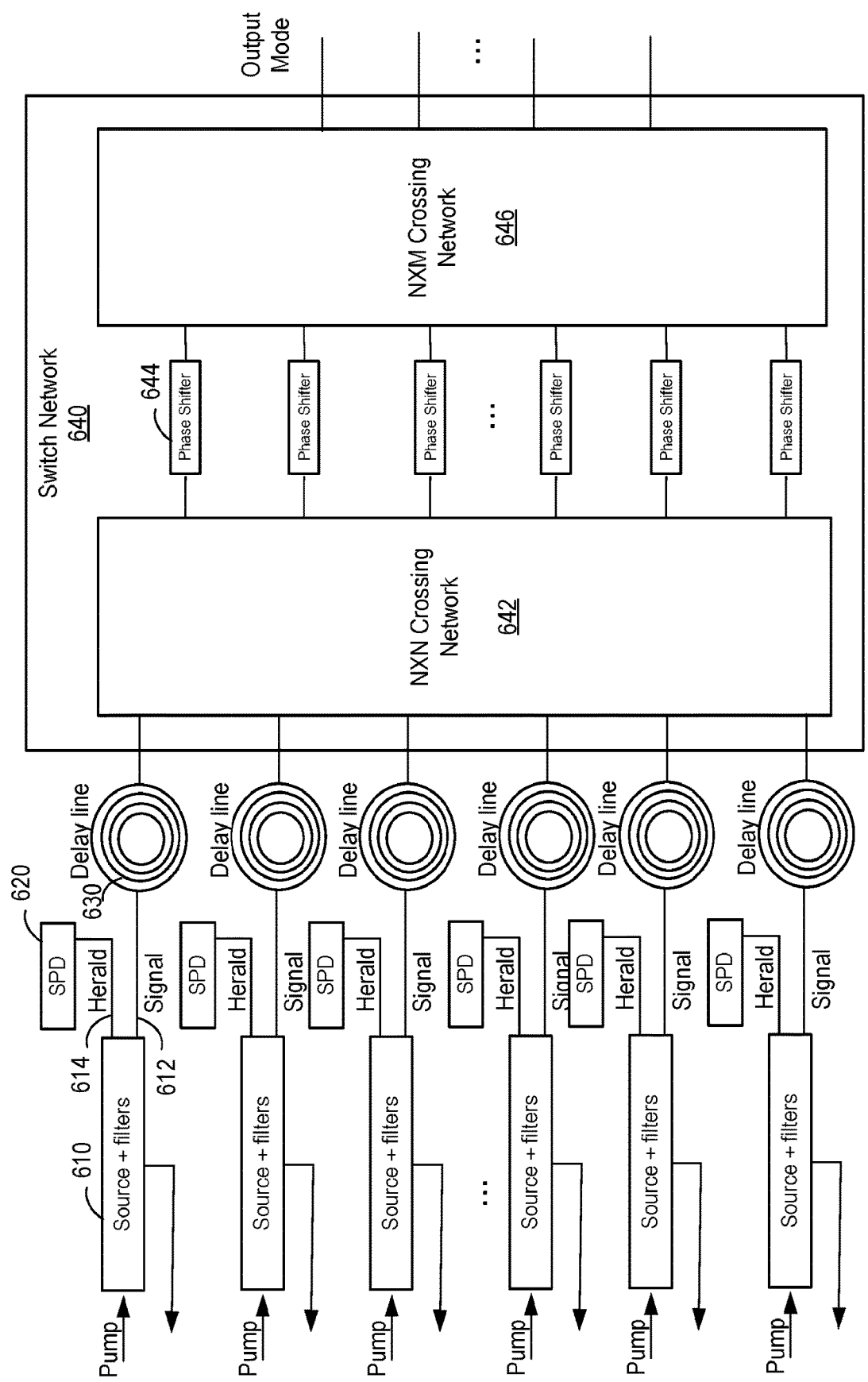
FIG. 6 illustrates an example of a PIC wafer including various photonic circuit components according to certain embodiments.

FIG. 6 illustrates an example of a multiplexed single photon source including components described above according to certain embodiments. A single photon source 610 may receive pump light (e.g., coupled from a fiber into a waveguides by a grating coupler) and generate a photon pair that includes a herald photon and a signal photon in, for example a ring oscillator made of a SiN waveguide. The herald photon and signal photon may be filtered, for example, by a wavelength division multiplexing (WDM) filter, such that the signal photon may be sent to a first output 612 and the herald photon may be sent to a second output 614. The herald photon may be detected by a single photon detector 620 (SPD, such as the SNSPD described above). The detection of the herald photon may signal the successful generation of the signal photon. In the multiplexed single photon source, the single photons, after generation, may be delayed by a delay line 630 for, e.g., about one or two nanoseconds. This delay provides time for the herald detectors to fire and for the required logic to be performed to actuate a switch network 640. The switch network 640 may route the photon from the successful source to the desired output waveguide.

In accordance with some embodiments, delays are produced using ultra-low loss waveguides, such as the low-loss SiN waveguides described above. In some parts of the architecture, optical fibers can be used, which are capable of allowing longer delays. In some embodiments, the delays may be short and fixed (i.e., do not grow as the size of the computation increases).

In accordance with some embodiments, switch networks may be implemented using generalized Mach-Zehnder interferometers (GMZIs). These interferometers may include an array of active phase shifters 644 (e.g., phase shifters 338, 422, and 524 described above) between two crossing networks 642 and 646 (e.g., completely mixing interference networks such as a Hadamard network). The active phase shifter 644 is a device capable of implementing an optical phase shift upon application of an applied voltage. The crossing networks 642 and 646 can be implemented with passive linear optical elements. The crossing network 642 may transform any single photon input into an equally spread wavefunction over all the modes. Each mode may enter an active phase shifter 644 that implements one of two phases to the optical mode (0 or π). After this, the mode may enter crossing network 646. This implementation may allow routing of any input mode of the optical switch to any output mode. There may only be a single active phase shifter in the path of the photon which minimizes loss in the switch network. If N input modes need to be switched to a single output mode, the second crossing network 646 can be significantly simplified.

In accordance with some embodiments, a photon number resolving detector can perform the qubit measurements, as well as detect herald photons emitted by the sources and can perform measurements to produce resource states. Many such detectors can be used, such as one that has a very high quantum efficiency so that a photon striking the detector can be detected with a very high probability. The detector may also have low dark counts so that in each time-bin the probability that the detector fires with no incident photon is very low. The detector may also be number resolving, so that when two photons strike the detector two counts are reported with high probability. Finally, to operate with a source of single photons at 1 GHz, the detectors may have very low timing jitter and rapid reset times.

In accordance with some embodiments, Superconducting Nanowire Single-Photon Detectors (SNSPDs) can be used as the single-photon detection technology for near-infrared photons. SNSPDS may have the combination of speed, timing accuracy and detection efficiency superior to many alternatives, but any detector technology could be used without departing from the scope of the present disclosure. In general, SNSPDs operate at cryogenic condition, for example, at a few Kelvin (considerably warmer than the millikelvin temperatures of many matter-based qubits). Furthermore, designs for number resolving detectors involve multiple SNSPDs can be employed. One conceptually simple way to achieve this is with a fanout of the incident waveguide onto a bank of SNSPDs but other designs are possible without departing from the scope of the present disclosure. The number of SNSPDs should be such that the probability of two incident photons striking a single SNSPD is sufficiently low.

In accordance with some embodiments, these hardware components, such as single photon sources, single photon detectors, delay lines, switches, and phase shifters, are present in a multiplexed single photon source as depicted in FIG. 6.

In the example depicted in FIG. 6, individual photon sources may receive a pump laser input pulse and produce a pair of photons that include a signal photon and a herald photon. The herald photon can be incident on a bank of photon number resolving detectors (e.g., SPDs 620). The signal photon passes through a delay line 630 prior to being sent to a switch network 640. The switch network 640 may include one or more crossing networks 642 and 646, such as Hadamard networks. A Hadamard network is a network of directional couplers that implements a Hadamard transformation on the input modes. In some embodiments, crossing networks 642 and 646 may include Mach-Zehnder Interferometers (MZIs) or generalized Mach-Zehnder Interferometers (GMZIs) as described in detail below. In FIG. 6, only the optical elements are shown and the electronic components and interconnects to implement logic and feed forward are not shows for the sake of simplicity.

In each time-bin the electrical signals from each detector pass through some classical logic that determines which source produced a photon. The signal from the logic unit actuates the phase shifters in the GMZI. These electrical elements are not indicated in the schematic. The optical delay lines may be sufficiently long to allow the detection, logic, and actuation of the phase shifts to take place.

In some embodiments, fast and low-loss optical switch networks can enable scalable quantum information processing using photonic qubits. More specifically, such networks can be employed within a linear-optical quantum computing (LOQC) system, since many such systems relies on non-deterministic processes of single-photon generation, entanglement generation and fusion measurements, and they also have important applications for quantum communications, such as enabling all-photonic quantum repeaters.

Advantageously, one or more embodiments disclosed herein provide for low loss, fast, and minimally-decohering photonic switch networks. Some embodiments provide for switch networks having a minimization of depth and count and are particularly suited for implementations that include active phase shifters, which are historically the largest contributors to the size and amount of noise in switch networks. Examples of switch networks will now be described. Such networks can be used, for instance, in any of the embodiments described above.

Components that can be used in photonic platforms include waveguides, directional couplers, passive and active (fast) phase shifters, crossings, single-photon detectors and heralded single-photon sources (HSPSs). Switch networks can be categorized according to their primary function as follows. N-to-1 (M) muxes (also referred to as N×1 muxes) map one (or multiple M) inputs to designated output ports. The inputs are commonly assumed to be probabilistic and of the same type, although more complicated assumptions apply in some problems. For example, a N-to-4 photon mux extracts groups of four photons from N HSPSs. Sometimes it is necessary to carefully distinguish the number of output (input) ports from the number of principal target outputs (inputs). Most commonly, the excess ports must be populated with the vacuum state, and the switch network is required to access specific distributions ("patterns") of the outputs (inputs) across the ports. We refer to switch networks as permutation networks when their primary purpose is to rearrange (subsets of) inputs, where the inputs should generally be regarded as inequivalent. Furthermore, switch networks are also classified on the basis of the photonic degree of freedom distinguishing their inputs. Schemes based on space and time are the most common, but the use of frequency, orbital angular momentum, and combinations of multiple degrees of freedom has also been proposed.

Figure 7A:
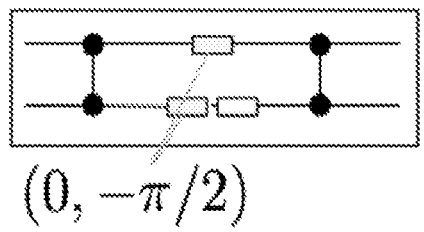
FIGS. 7A and 7B show building blocks of composite switch networks.
Figure 7B:
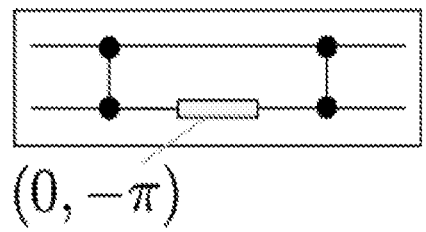

In some embodiments, Mach-Zehnder Interferometers (MZIs) may be used which are networks that implement identity or swap operations on two inputs. Two possible realizations of this type of circuit are shown in FIGS. 7A and 7B. FIGS. 7A and 7B show building blocks of composite switch networks. FIGS. 7A and 7B show 2-to-2 MZIs that implement identity or swap operations on the inputs. The circuits consist of two directional couplers with an active phase shifter (gray) on one or both arms between them. The push-pull configuration shown in FIG. 7A also has a fixed passive $-\pi/2$ phase shift (white) on one arm and selects between the two operations by setting the top or bottom active phase to $-\pi/2$. The configuration shown in FIG. 7B uses a 0 or $-\pi$ active phase to select the operation. Many switch network architectures are built by connecting multiple MZIs to form various topologies.

Figure 7C:
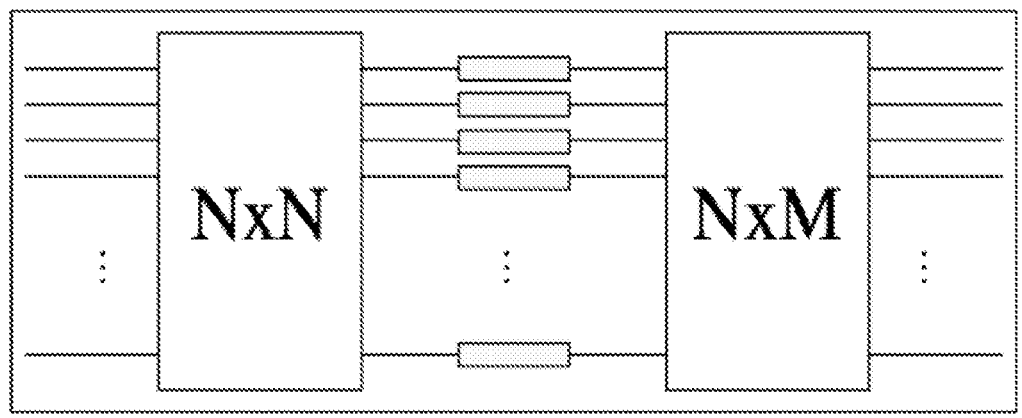
FIG. 7C shows a N-to-M GMZI made of two passive balanced splitter networks and a layer of N active phase shifters.

The Generalized Mach-Zehnder Interferometer (GMZI) is an extension of an MZI with N>2 inputs and M≥1 outputs, shown in FIG. 7C. This configuration allows a set of permutations to be performed on the inputs, as discussed in further detail below, making this device a powerful block for the construction of composite N-to-1 and N-to-M switch networks. FIG. 7C shows a N-to-M GMZI made of two passive balanced splitter networks and a layer of N active phase shifters. Varying the settings of the active phases selects specific permutations of the N inputs and routes them to M>1 output ports.

There are a number of spatial max schemes that select one of multiple inputs from distinct locations in space. For example, a N-to-1 GMZI can be used as a mux, since it allows routing of any input to a single output port. The advantages of this scheme are its low constant active phase shifter depth (1) and count (N). However, the total propagation distance and the number of waveguide crossings increase rapidly with N. This downside of the monolithic GMZI structure is obviated by constructing composite switch networks of 2-to-1 MZIs, at the cost of increasing the component depth and count. Two examples of N-to-1 schemes of this kind include the "log-tree" and "chain", both of which can be built with no crossings.

Figure 8A:
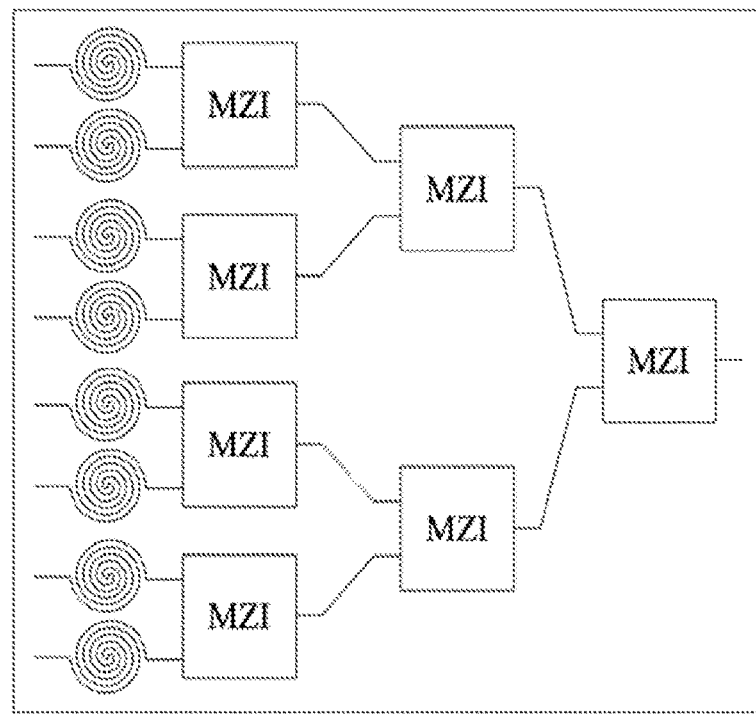
FIGS. 8A and 8B show spatial N-to-1 muxes, with inputs at N spatially-distinct locations (ports).
Figure 8B:
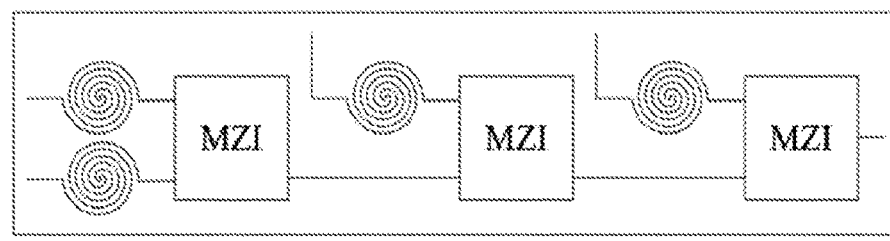

FIGS. 8A and 8B show spatial N-to-1 muxes, with inputs at N spatially-distinct locations (ports). FIG. 8A shows a log-tree mux (N=8 example). 2-to-1 MZIs form a tree structure with $2(2^{\lceil log_2(N) \rceil}-1)$ active phase shifters arranged in $\lceil log_2(N) \rceil$ layers. FIG. 8B shows a chain mux (N=4 example). (N−1) MZIs are connected through one output and input to form a line. The active phase shifter count is the same as for the log-tree, but the depth varies between 1 and (N−1).

In a "log-tree", the MZIs form a converging symmetric tree of degree 2, where the chosen input is routed from one of the leaves to the root, as shown in FIG. 8A. An asymmetric variant of this scheme, known as a "chain", includes MZIs cascaded to form a linear topology in which each block selects either the output of the previous block or the new input, as shown in FIG. 8B. The depth of the network traversed by the output depends on the chosen input, which can worsen the interference of resources from different chains, due to imbalanced losses and errors. The switching logic of this scheme presents an interesting advantage: while being very simple and entirely local to each individual MZI, it minimizes the amount of error on by selecting the input available closest to the output. Analysis of these three schemes in the context of single photon multiplexing shows that all three architectures require components with performance well beyond the state-of-the-art to achieve a multiplexing efficiency high enough for use in LOQC.

Figure 9A:
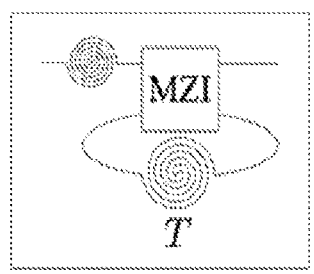
FIGS. 9A and 9B show N-to-1 temporal muxes, with inputs in N distinct time bins.

In temporal multiplexing, resources can be input at the same spatial location but different times, and the aim is to produce an output in a specific time bin. This requires networks with fewer components, but the output time bins become longer. There are two main kinds of temporal schemes: designs with storage devices, such as cavities or fiber loops, and designs based on networks of delays The former simply consist of a storage device and a single 2×2 switch network used to choose whether to store or output each input, as shown in FIG. 9A. This can be thought of as the temporal version of a chain mux, and it presents the same advantage in terms of switching logic. The log-tree also has a temporal equivalent known as a "binary-division delay network". This scheme consists of a series of MZIs with delays of different lengths between them; as illustrated in FIG. 9B.

Figure 9B:
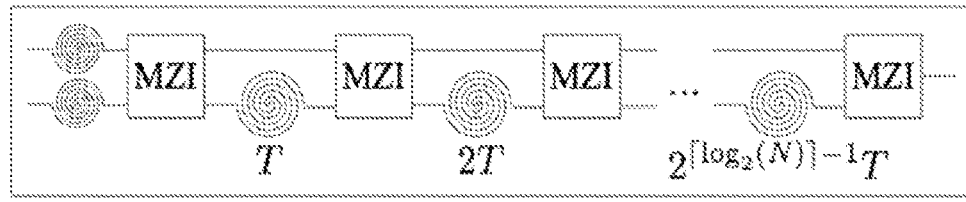

FIGS. 9A and 9B show N-to-1 temporal muxes, with inputs in N distinct time bins. FIG. 9A shows a storage loop scheme (time chain). A 2×2 MZI receives one resource per time bin T and routes it to a storage device (a delay line here) or discards it. After N time bins, the chosen input is output. The number of active phase shifters in the path of the chosen input varies between 1 and N. FIG. 9B shows a binary delay network (time log-tree). The scheme comprises a series of $\lceil log_2(N) \rceil + 1$ MZIs with delays of lengths $2^n T$ between them, where T is the duration of a time bin at the input and n=0, ..., $\lceil log_2(N) \rceil - 1$. The active phase shifter depth scales as with the number of input time bins as $\lceil log_2(N) \rceil$.

The topologies described above can be generalized by replacing each MZI with a GMZI with n inputs, as shown in FIGS. 10A-10D. This introduces a trade-off between the active phase shifter depth and count, which decreases with n, and the number of waveguide crossings and propagation distance within each block, which increases with n. In addition, this modification turns temporal schemes into hybrid networks, where multiple spatially distinct resources are input in each time bin. The trade-offs introduced by the parameter n can be exploited to optimize the structure of these schemes for different regimes of physical error rates.

Figure 10B:
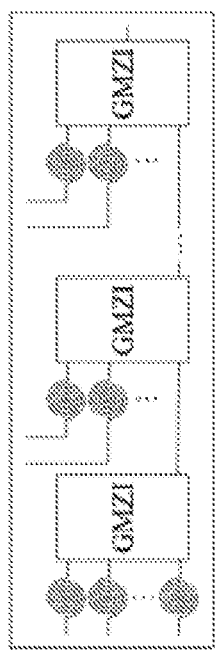
FIGS. 10A-10D show examples of generalized N-to-1 composite multiplexing networks.
Figure 10C:
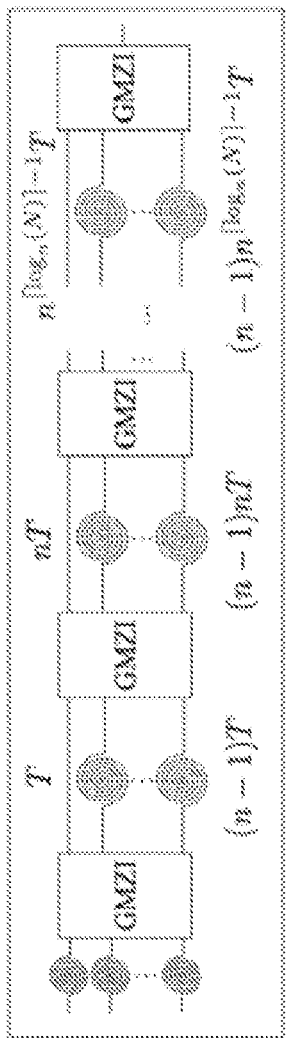
Figure 10D:
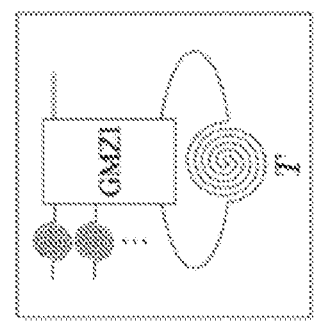
Figure 10A:
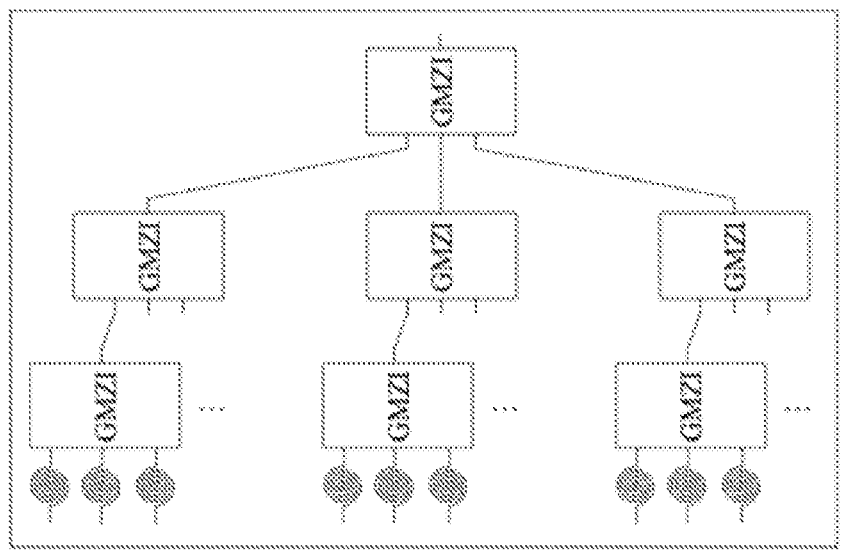

FIGS. 10A-10D show examples of generalized N-to-1 composite multiplexing networks, obtained by replacing the MZI sub-blocks with n×1 GMZIs. FIG. 10A shows a generalized spatial log-tree (n=3 example with some first layer GMZIs omitted for simplicity). The degree of the tree is n and its depth is $\lceil \log_n N \rceil$. FIG. 10B shows a generalized spatial chain. Each stage after the first takes n−1 new inputs, so that the depth of the network varies between 1 and $\lceil (N-1)/(n-1) \rceil$. FIG. 10C shows a generalized delay network (time log-tree). The GMZIs enclose $\lceil \log_n N \rceil$ layers of n−1 delays with lengths $n^i, \ldots, (n-1)n^i$, where $i=0, \ldots, \lceil \log_n N \rceil - 1$ is the index of the layer of delays. The number of active phase shifters on a path across the scheme is $\lceil \log_n N \rceil + 1$. FIG. 10D shows a generalized storage loop scheme. The n−1 inputs enter the GMZI in every time bin. After $\lceil N/(n-1) \rceil$ time bins, the GMZI outputs the chosen input.

In applications such as LOQC, which rely on the interference of multiplexed resources, multiplexing is used to produce synchronized outputs. The schemes described so far achieve this by having a single predetermined output spatio-temporal bin. However, when large output probabilities are needed this leads to a large of resources, which can be understood as follows. The number of available resources for a network of size N follows a binomial distribution with average value $\bar{N}=Np$, where p is the probability of an input being populated. The probability of a network successfully producing an output is then $p_{mux}=1-(1-p)^N$. For the typical situation with large N and small p values, the binomial distribution is well approximated by a Poissonian distribution, and so $p_{mux} \cong 1-e^{-Np}$. It follows that the average number of inputs scales as $Np=-\ln(1-p_{mux})$, and so the number of available resources that are not used grows rapidly as $p_{mux}$ approaches 1. An alternative approach that leads to major efficiency improvements is relative multiplexing. Rather than routing resources to single pre-allocated outputs, this technique uses spatial or temporal log-tree networks to synchronize selected inputs in variable space-time locations, chosen depending on the resources available at any particular instant.

N-to-M schemes in the literature are generally based on the spatial degree of freedom. The simplest of these is a GMZI with more than one output, which has the appealing feature of a single layer of N active phase shifters. However, it only gives access to N permutations, and therefore to limited combinations of inputs. Consequently, the N×M GMZI is more useful when used as a permutation network or as a building block for larger schemes. More flexible routing is achieved by using smaller networks to build composite topologies, known as "switch fabrics". However, the component depth and count and the size of the crossing networks of these schemes tend to be large, and these downsides trade against each other, making the networks impractical for use in the field of quantum applications.

Figure 11A:
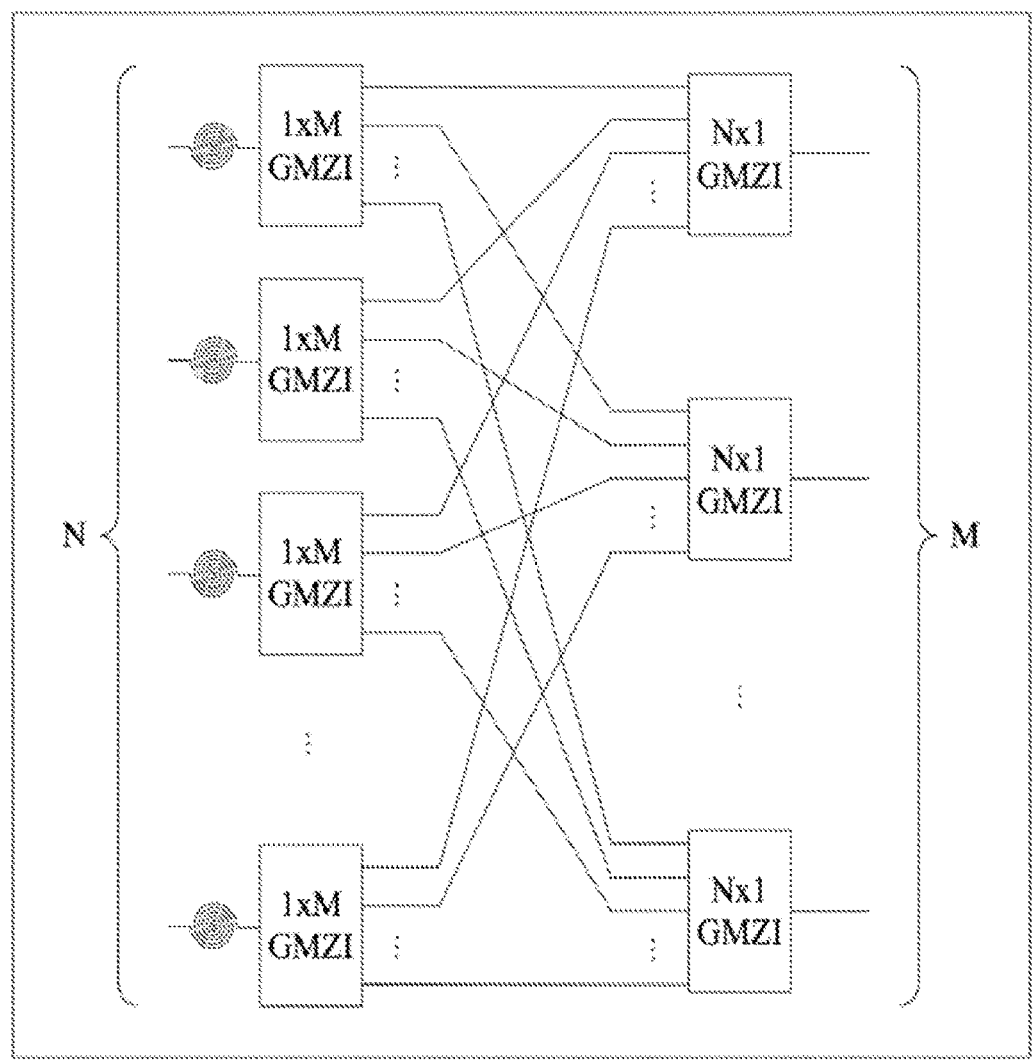
FIGS. 11A and 11B show examples of N-to-M switch networks.

As an example, Spanke's tree network, shown in FIG. 11A, allows arbitrary rerouting of the inputs with a constant active switch depth of 2, at the cost of a large number of active phase shifters and waveguide crossings. However, the number of active phase shifters and waveguide crossings scales as O(NM). On the other hand, the scheme shown in FIG. 11B avoids large crossing networks, but has an active phase shifter count O(NM) and depth that varies between 1 and M, resulting in variable error rates on the outputs.

Figure 11B:
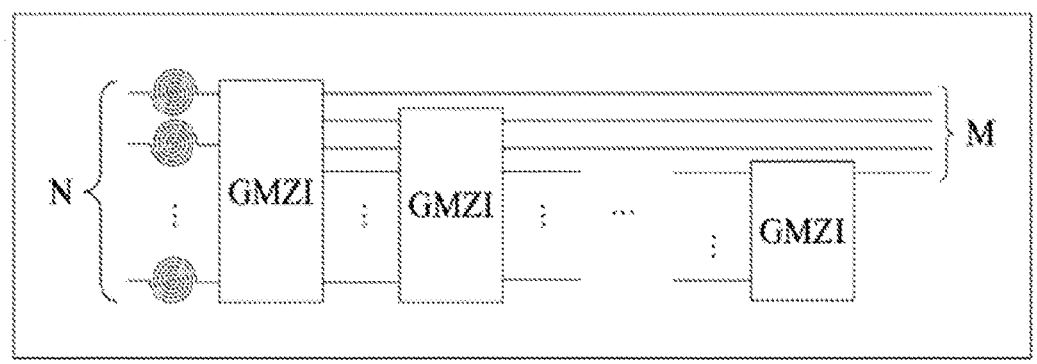

FIGS. 11A and 11B show examples of N-to-M switch networks. FIG. 11A shows a Spanke network. Two layers of interconnected GMZIs allow arbitrary routing of N inputs to M outputs. The fixed active phase shifter depth of 2 makes this scheme interesting, but the scaling of the number of active phase shifters and crossings scaling as (NM) poses challenges for large sizes. FIG. 11B shows a concatenated GMZI. This scheme consists of M concatenated GMZIs with progressively fewer outputs. No complex crossing networks are required between its building blocks, but the O(NM) active phase shifter count and variable depth up to M limit the maximum feasible network size.

For quantum applications, where low error rates are required, N-to-M muxes need to be simplified to reduce the number of active phase shifters, both in total and along the path to the output, as well as the complexity of the crossing networks. The routing algorithms associated with these networks also need to be simplified, to avoid the need for unfeasibly long delays for the inputs. The complexity of the logic is largely determined by its generality, so restricting the operation of the networks to specific tasks is helpful to reduce processing times. These provide guiding principles for the design of additional schemes.

A general switch network implements a set of unitary transfer matrices $U_k$, where each unitary routes light between a subset of input and output ports. If $U_k$ routes light from port t to port s, then its sth row and tth column must be zero apart from $|U_{s,t}|=1$, and similarly for other pairings of input and output ports. The aim of this section is to elucidate the sets of routing operations that are achievable using the simplest form of a many-mode switching network, which is to say one corresponding to transfer matrices $U_k=WD_kV^\dagger$, where the unitary matrices W, $V^\dagger$ describe passive interferometers, and the $D_k$ form a set of diagonal phase matrices. The phase matrices are implemented physically using a single layer of fast phase shifters acting on every mode, and for simplicity, we will write D in terms of a phase vector d, $D_{s,t}=d_s\delta_{s,t}$. The discussion below provides a comprehensive treatment of these switch networks and presents several new constructions.

An important class of switch networks is obtained by considering sets of permutation matrices $\{U_k=WD_kV^\dagger\}$. By adding the fixed passive network corresponding to e.g. $U_1^{-1}$ (so, the inverse of an arbitrary permutation from that set), we obtain a new set $\{U_kU_1^{-1}\}=\{WD'_kW^\dagger\}$ of pairwise commuting permutation matrices. So it makes sense to restrict the discussion to the case where the $\{U_k\}$ are commuting. Switch networks of this type were introduced above as "generalized Mach-Zehnder interferometers" (GMZIs). Here we need a more precise definition for GMZIs, and we will define them as switch networks having the following specific properties:

(i) $\{U_k=WD_kW^\dagger\}$ is a set of transfer matrices corresponding to commuting permutations of N modes. The entries of $D_k$ are given by roots of unity (up to an overall global phase factor $e^{i\Phi_k}$ which can be chosen at will).

(ii) The GMZI switch setting $D_k$ routes light from input port 1 to output port k.

From these properties it is straightforward to prove that the GMZI must have exactly N settings, and that for any choice of input and output port, there is exactly one setting which routes light between the ports.

From a mathematical standpoint, the set of operations implemented by a GMZI on N modes forms an abelian group of order N. This fact is very helpful here as it allows us to characterize the entire family of GMZIs defined by (i), (ii) using well-known results from group theory (namely the basis theorem for finite abelian groups). In particular, for any GMZI, $\{U_k\}$ must be isomorphic to a direct sum of cyclic groups, where the order of each of the cyclic groups is a power of a prime number.

To be more concrete, we define groups of commuting permutations $\mathcal{G}([n_1, n_2, \ldots, n_r])$ generated by matrices $C^{(n_1)} \otimes I^{(n_2)} \otimes I^{(n_3)} \ldots, I^{(n_1)} \otimes C^{(n_2)} \otimes I^{(n_3)} \ldots, I^{(n_1)} \otimes I^{(n_2)} \otimes I^{(n_3)} \ldots$, where $(C^{(n)})_{i,j} = \delta_{i,(j+1 \bmod n)}$ is a cyclic permutation matrix of size n, and $I^{(n_l)}$ is the $n_l \times n_l$ identity matrix, and $\otimes$ is the Kronecker product on matrices (The Kronecker product here acts at the level of linear-optical transfer matrices and should not be confused with tensor product operations on quantum state spaces), and the group operation is matrix multiplication. Then, any GMZI on N modes, satisfying properties (i), (ii) above, must implement a set of permutation operations which corresponds to one of the possibilities for $\mathcal{G}[n_1, n_2, \ldots, n_r]$ with $N = \Pi_{l=1}^r n_l$ (up to fixed mode permutations at the input and output).

The different types of GMZIs of fixed size can now be determined using the fact that $\mathcal{G}([n_1, n_2])$ and $\mathcal{G}([n_1 n_2])$ are isomorphic if and only if $n_1$ and $n_2$ are coprime. For example, for N=8, we can identify three fundamentally different types of GMZI:

(i) $\mathcal{G}([2,2,2])$, permutations are generated by Pauli matrices $X \otimes I^{(2)} \otimes I^{(2)}$, $I^{(2)} \otimes X \otimes I^{(2)}$, $I^{(2)} \otimes I^{(2)} \otimes X$.

(ii) $\{\mathcal{G}([4,2])\}$, permutations are generated by matrices $C^{(4)} \otimes I^{(2)}$ where $$C^{(4)} = \begin{pmatrix} & & & 1 \\ 1 & & & \\ & 1 & & \\ & & 1 & \end{pmatrix},$$

and $I^{(4)} \otimes X$.

(iii) $\mathcal{G}([8])$, permutations are generated by matrix $$C^{(8)} = \begin{pmatrix} & & & & & & & 1 \\ 1 & & & & & & & \\ & 1 & & & & & & \\ & & 1 & & & & & \\ & & & 1 & & & & \\ & & & & 1 & & & \\ & & & & & 1 & & \\ & & & & & & 1 & \end{pmatrix}.$$

We refer to GMZIs implementing $\mathcal{G}([2, 2, \ldots, 2])$, i.e. permutations of the form of swaps on subsets of modes, as "Hadamard-type" GMZIs due the type of passive interferometer which is used (explained below). Similarly, we refer to GMZIs implementing $\mathcal{G}([N])$ as "discrete-Fourier-transform (DFT)-type".

The discussion above characterizes the routing power of linear-optical circuits using one-layer of fast phase shifters in the switch network. In particular, a GMZI on N modes is limited to N routing operations, which is obviously small compared to the N! possible mode rearrangement operations. However, the possibility of implementing different sets of permutation operations is exploited by some of designs for spatial and temporal muxes which are discussed herein. Strictly speaking the limitation to N operations originates in property (ii) above—i.e. the ability to route light from any input port to any output port. More general constructions using a single stage of active phase shifts can be trivially obtained by acting with separate GMZIs on subsets of modes. The resulting transfer matrices are given by the direct sum of the individual GMZIs' transfer matrices. For example, using three MZIs in parallel results in a switch network on 6 modes, allowing 8 different settings. Such a construction can implement abelian groups of permutations of maximum order, which are given in J. M. Burns and B. Goldsmith, Bull. London Math. Soc. 21, 70 (1989), with the number of operations scaling to good approximation as $\sim 3^{N/3}$.

We now turn to linear-optical circuits that can implement the GMZIs defined above. In particular, a circuit that can implement the routing operations $\mathcal{G}([n_1, n_2, \ldots, n_r])$ on $N = \Pi_{l=1}^r n_l$ modes must enact transfer matrices of the form, $$P_k = (C^{(n_1)})^{k_1} \otimes (C^{(n_2)})^{k_2} \otimes \ldots \otimes (C^{(n_r)})^{k_r},$$

with settings vector k where $0 \leq k_l < n_l$ with $l=1, \ldots, r$. This can be achieved using a circuit with transfer matrices W $D_k W^\dagger$ as follows:

$$W = W^{(n_1)} \otimes W^{(n_2)} \otimes \cdots \otimes W^{(n_r)}$$

$$\text{with } (W^{(n_l)})_{s,t} = \frac{e^{j2\pi st/n_l}}{\sqrt{n_l}},$$

where the $W^{(n_l)}$ are DFT matrices; the $k^{th}$ setting of the fast phase shifters is given by $$D_k = D_{k_1}^{(n_1)} \otimes D_{k_2}^{(n_2)} \otimes \ldots \otimes D_{k_r}^{(n_r)},$$

with $(d_k^{(n)})_s = e^{-j2\pi ks/n}$ for $D_k^{(n)}$.

One route to constructing practical interferometers for W and $W^\dagger$ is to reduce them to networks of beam-splitter and phase-shifter components using generic unitary decompositions from M. Reck et al., Phys. Ref. Lett. 73, 58 (1994), or W. R. Clements et al., Optica 3, 1460 (2016). These decompositions have optical depth (number of optical elements encountered on the longest path through the interferometer) scaling as 2N−3 and N respectively. This means that the transmittance along the longest path will scale with an exponent which is proportional to the size parameter N—which presents a severe experimental limitation for scaling to large GMZI sizes.

GMZI networks—having a lot of special structure—allow for specific decompositions of the type given by an equation 1200 shown in FIG. 12, where the matrices $S_{\ldots}$ correspond to crossing networks which reorder modes within the interferometer. Since the subexpressions of the form $I^{(N/n_l)} \otimes V^{(n_l)}$ correspond to repeated blocks of modes interfering according to unitary $V^{(n_l)}$, the equation for W in FIG. 12 can be seen to describe stages of local interference separated by crossing networks. Note also that since the bracketed expressions in the decomposition commute there is some freedom in the configuration of the crossing networks, and some of them can be treated as relabelings of modes rather than physical circuit elements. FIG. 13A illustrates the construction of a Hadamard-type GMZI using the decomposition, as well as simplification which is possible when the GMZI is used as a N-to-1 mux.

FIGS. 13A and 13B show Hadamard-type GMZI constructions: (i) in FIG. 13A, illustration of a linear-optical circuit for a GMZI on N=16 modes, for which the fast phase shifters are set to configurations of 0 and π to select one of 16 operations from $\mathcal{G}([2,2,2,2])$; (ii) in FIG. 13B, possible simplification of the circuit when only one output port is required—as is the case when the GMZI is used as a N-to-1 max. The passive interferometers are constructed following the decomposition of W with stages of interference using 50:50 beam-splitters or directional couplers on pairs of adjacent modes, separated by crossings networks. Note that the phases in the physical interferometer generally differ from the constructions given in the main text, and this implies minor modifications for the transfer matrices and phase-shifter settings.

For more general GMZI types, we note that the unitary matrices $V^{(n_i)}$ can be decomposed into elementary beam-splitter and phase-shifter operations using the generic decomposition methods mentioned above. Alternatively, since the $V^{(n_i)}$ are assumed to be discrete Fourier transforms, they can be recursively decomposed into smaller discrete Fourier transforms acting on sets of local modes $I^{n_i/(n_i')} \otimes V^{(n_i')}$, $I^{n_i/(n_i'')} \otimes V^{(n_i'')}$ (for any sizes satisfying $n_i = n_i' \times n_i''$) together with crossings networks and additional phase shifts.

One more subtle feature of the GMZI constructions that was remarked on above is that the matrices $D_k$ for the GMZIs are determined up to a setting-dependent global phase factor $e^{i\phi_k}$. In principle these global phases can be freely set over a range $[0,2\pi)$ (provided the active phase shifters themselves are configured with sufficient phase range). For an application such as single-photon multiplexing, the global phase factors have no role in the operation of the switch network. However, they can be useful if the switch network is applied to only some part of the input states (e.g. single rails from dual-rail qubits) or if it is incorporated in larger interferometers. In these cases, additional functionality can be absorbed into the operation of the switch network without adding extra layers of switching.

The discussion so far presented a large family of GMZIs and explained their key properties, taking an approach focused on achievable sets of permutations which is different to earlier works. As well as N-to-1 muxing (potentially with extra functionality as explained above), these GMZIs have assorted applications as building blocks for spatial and temporal muxes. Alternative constructions of GMZIs are also possible, and it is valuable to explore them with a view to minimizing practical requirements on fast phase shifters. However, it is not feasible to exhaust all possible GMZI designs, as some properties for Hadamard matrices are not known. Instead we will highlight some specific new constructions with useful properties.

One observation is that phase swing requirements (where the swing is defined per phase shifter as the difference between the maximum and minimum phase shifts across all GMZI settings) can sometimes be reduced by introducing fixed phase-shift offsets. For some of the constructions above, the phase shifter settings correspond to complete sets of roots of unity, and the phase swing is π for Hadamard interferometers and >π for the other GMZI types. Table 1 shows examples of reduced swing for GMZI sizes N=2,3,4 including examples of GMZIs with reduced phase swing using fixed phase-shift offsets. It is assumed that all the fast phase shifter components are identical and access the same range of phase shifts (which is minimized). Note that the use of offsets necessitates modification of the GMZI transfer matrices by additional phase factors—corresponding to setting-dependent "global" phases at the output.

TABLE 1

| GMZI type | Phase offsets | Comment |
|---|---|---|
| Hadamard N = 2 | (−3π/2, 0) | Swing reduced from π to π/2, coinciding with MZI variant in FIG. 7A. |
| DFT N = 3 | (−4π/3, 0, 0) | Swing reduced from 4π/3 to 2π/3. |
| Hadamard N = 4 | (−π, 0, 0, 0) | Swing unchanged at π, but for each setting only one phase shifter is set to π and the others to 0. |

To find some more subtle constructions, we can consider general constraints on GMZIs implementing transfer matrices $U_k = W D_k V^\dagger$ on N modes, which are required to act minimally as N-to-1 muxes. It is straightforward to prove a lemma stating that (a), V in this case must be proportional to a complex Hadamard matrix (i.e. V must satisfy $|V_{s,t}| = 1/\sqrt{N}$ as well as being unitary), and (b) the phase vectors $d_k$ must be orthogonal. A simple consequence of this result is that it is never possible to construct any GMZI for which the phase-shifter swing is less than π/2 (since it is never possible to achieve 0 for the real part of $\langle d_k, d_{k'} \rangle$). Similarly, when the phase-shifter values are restricted to {0, π/2} it is not possible to find more than 2 orthogonal vectors $d_k$ for any even value of N (and never more than 1 for odd values of N), which is to say that it is not possible to do better than a 2-to-1 mux.

As another application of this lemma, one can look for sets of orthonormal phase vectors $\{d_k\}$ and construct a GMZI which uses these as phase settings for a N-to-1 mux, by choosing V to have row vectors $v_k = d_k$, and any unitary W with first row vector $w_1 = (1, 1, \ldots, 1)/\sqrt{N}$. An interesting and non-trivial example of such a set of phase vectors is given in Table 2. More specifically the able below shows examples of six orthogonal phase vectors with a subset $d_1, \ldots, d_4$ having a reduced phase swing of 2π/3 (compared to 4π/3 for the entire set). A N=6 GMZI constructed using these settings can implement a 4-to-1 mux which has phase swing of only 2π/3 (by restricting to the first four phase-shifter settings). Furthermore, it is easily seen that this example is not related to the constructions above since the only possibility would be the GMZI implementing $\mathcal{G}([6]) = \mathcal{G}([3,2])$, for which individual phase settings range on six values (compared to three in Table 2).

TABLE 2

Settings for a N = 6 GMZI acting as a 6-to-1 mux $d_1 = (1, 1, 1, e^{-2i\pi/3}, e^{-2i\pi/3}, e^{-2i\pi/3})/\sqrt{6}$
$d_2 = (1, e^{-2i\pi/3}, e^{-2i\pi/3}, 1, e^{-2i\pi/3}, 1)/\sqrt{6}$
$d_3 = (e^{-2i\pi/3}, 1, e^{-2i\pi/3}, e^{-2i\pi/3}, 1, 1)/\sqrt{6}$
$d_4 = (e^{-2i\pi/3}, e^{-2i\pi/3}, 1, 1, 1, e^{-2i\pi/3})/\sqrt{6}$
$d_5 = (1, e^{-2i\pi/3}, e^{-4i\pi/3}, e^{-2i\pi/3}, 1, e^{-4i\pi/3})/\sqrt{6}$
$d_6 = (e^{-2i\pi/3}, 1, e^{-4i\pi/3}, 1, e^{-2i\pi/3}, e^{-4i\pi/3})/\sqrt{6}$ Finally, we turn to a new way of using GMZIs when phase settings are modified from those connecting single input and output ports. Taking Hadamard-type GMZIs with transfer matrices $U_k = W D_k W^\dagger$ on N modes, consider first when the phase vector $d_{k'}$ for $D_{k'}$ is modified so that −π phases are set to a (common) value −φ, while the 0 phases are unchanged. In this case $U_{k'}$ is modified to $$\tilde{U}_{k'}(\phi) = e^{-i\phi/2}\left[\cos\left(\frac{\phi}{2}\right)I^{(N)} + i\sin\left(\frac{\phi}{2}\right)\tilde{U}_{k'}\right].$$

This unitary maps a single photon incident at one input port to a superposition across the mode at the input and the output under the permutation $U_k$, with weighting controlled by the value of $\phi$. Further modification of the phase settings can achieve mappings from one input to arbitrary pairs of output ports—suppose it is desired to map from input port $p_1$ to output ports $q_1$ and $q_2$, then this can be implemented by finding the (unique) settings $k_1$, $k_2$ with $U=W\ D_{k_{1(2)}} W^\dagger : p \mapsto q_{1(2)}$, and choosing phase vector $$\tilde{d} = e^{-i\phi/2}\left[\cos\left(\frac{\phi}{2}\right)d_k + i\sin\left(\frac{\phi}{2}\right)d_{k'}\right].$$

The transfer matrix for the GMZI is then $$\tilde{U}(\phi) = e^{-\frac{i\phi}{2}}\left[\cos\left(\frac{\phi}{2}\right)U_k + i\sin\left(\frac{\phi}{2}\right)U_{k'}\right],$$

where the individual phase settings are taken from the set $\{0, -\phi, -\pi, -\pi-\phi\}$. Note that a second input port $p_2$ is also mapped to the pair $q_1$ and $q_2$, where $U_k U_{k'} : p_1 \mapsto p_2$. We call a GMZI used according to the equation above for $\tilde{U}(\phi)$ a switchable pairwise coupler and it can be useful in spatial and temporal muxes (with the proviso that paired ports receive the vacuum state to avoid contamination of the intended input).

As foregoing examples illustrate, a set of 2×2 muxes can be used to rearrange a group of photons propagating in a set of waveguides, which can increase the probability of providing a pattern of photons that corresponds to a usable input state of a downstream circuit. It will be appreciated that embodiments described herein are illustrative and can be modified. Although some examples may make reference to use-cases related to quantum computing, where photons may be used to implement systems of qubits, it should be apparent from this disclosure that the switching techniques described herein are applicable in other photonic circuits where a particular spatial arrangement of photons is desired. It should also be understood that providing a usable input state to a particular downstream circuit may not guarantee that the downstream circuit generates a desired output state. For example, the Bell state generators described herein operate non-deterministically, and a usable input state does not necessarily result in a Bell state at the outputs.

It should also be apparent from this disclosure that the applicability of the multiplexers, switches, and switching networks disclosed herein is not limited to single photons. For example, some applications of optical signaling may use pulsed lasers or the like to generate discrete wave packets (which can be understood as groups of photons) that propagate through waveguides. Embodiments of multiplexers, switches, and switching networks disclosed herein can be used to spatially and/or temporally align wave packets in a variety of optical circuits. In various embodiments, multiplexers, switches, and switching networks disclosed herein can operate on "signal pulses," where a signal pulse can be a single photon or a multi-photon wave packet. As such, anywhere in the present disclosure where single photons are disclosed should be understood to also include multi-photon wave packets, signal pulses and the like.

Further, embodiments described above include references to specific materials and structures (e.g., optical fibers), but other materials and structures capable of producing, propagating, and operating on photons can be substituted. Switching techniques are described above in the context of optical/photonic circuits; however similar techniques may be applied to synchronize and/or spatially align other types of propagating signals.

Control logic to control the switches and other optical components described herein can be implemented as a digital electronic logic circuit with an arrangement of logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). Control logic can be implemented on-chip with the waveguides, beam splitters, detectors and/or and other photonic circuit components or off-chip as desired. In some embodiments, photon sources, detectors, optical switches, and/or other optical circuit components can be coupled to an off-chip computer system having a processor and a memory, and the off-chip computer system can be programmed to execute some or all of the control logic.

It should be understood that all numerical values used herein are for purposes of illustration and may be varied. In some instances, ranges are specified to provide a sense of scale, but numerical values outside a disclosed range are not precluded. Terms such as "synchronized" or "simultaneous" (or "same" or "identical") should be understood in the engineering rather than the mathematical sense: finite design tolerances can be defined, and events separated by less than the design tolerance may be treated as synchronized or simultaneous. A "time bin" refers to a temporal mode that distinguishes different photonic states in the same waveguide (or spatial mode), and photons in the same time bin may be referred to as arriving "concurrently" or "simultaneously" at a particular point. The duration of a time bin can be defined based on characteristics of the optical circuits (e.g., there may be some variation in the delay between pumping a photon source and obtaining an output photon from the source), and successive time bins can be separated by arbitrary time periods.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of if used to associate a list, such as A, B, or C, can be interpreted to mean any combination of A, B, and/or C, such as A, B, C, AB, AC, BC, AA, AAB, ABC, AABBCCC, etc.

Reference throughout this specification to one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A photonic integrated circuit comprising:
   a substrate;
   a plurality of oxide layers on the substrate;
   silicon nitride (SiN) waveguides in the plurality of oxide layers and configured to transport photons;
   a Pockels effect optical phase shifter in the plurality of oxide layers and configured to change phase delays of photons transported by a first SiN waveguide of the SiN waveguides;
   a superconductive nanowire single photon detector (SNSPD) in the plurality of oxide layers and configured to detect photons transported by a second SiN waveguide of the SiN waveguides;
   an optical isolation structure in the plurality of oxide layers, the optical isolation structure surrounding the SNSPD and configured to block stray light; and
   an undercut region formed in the substrate, the undercut region below a region of the plurality of oxide layers and configured to thermally isolate the region of the plurality of oxide layers.

2. The photonic integrated circuit of claim 1, wherein the Pockels effect optical phase shifter includes a BaTiO$_3$ optical phase shifter of an optical switch.

3. The photonic integrated circuit of claim 1, wherein the optical isolation structure surrounding the SNSPD includes a portion of a silicide layer, a portion of a metal layer, a metal trench, or a combination thereof.

4. The photonic integrated circuit of claim 1, wherein the SiN waveguides are on two or more SiN layers that are characterized by different thicknesses.

5. The photonic integrated circuit of claim 1, further comprising a single photon generator in the plurality of oxide layers.

6. The photonic integrated circuit of claim 1, further comprising a silicon grating coupler in the plurality of oxide layers, the silicon grating coupler configured to couple light into or out of the SiN waveguides.

7. The photonic integrated circuit of claim 1, further comprising a silicon nitride grating coupler in the plurality of oxide layers, the silicon nitride grating coupler configured to couple light between two SiN waveguides of the SiN waveguides.

8. The photonic integrated circuit of claim 1, wherein the substrate includes a V-groove for aligning an optical fiber.

9. The photonic integrated circuit of claim 1, further comprising a silicon layer on a buried oxide layer of the plurality of oxide layers.

10. The photonic integrated circuit of claim 1, further comprising a temperature sensor in the plurality of oxide layers.

11. The photonic integrated circuit of claim 1, further comprising a silicide heating element in the plurality of oxide layers.

12. The photonic integrated circuit of claim 1, further comprising a Ge photodiode in the plurality of oxide layers, the Ge photodiode configured to detect optical communication signals.

13. The photonic integrated circuit of claim 1, further comprising an optical interposer between the substrate and the plurality of oxide layers, the optical interposer including at least two silicon nitride waveguide layers characterized by different thicknesses.

14. A method comprising:
fabricating a first wafer that includes:
a first substrate;
a first plurality of oxide layers on the first substrate;
silicon nitride (SiN) waveguides in the first plurality of oxide layers; and
a superconducting nanowire single photon detector (SNSPD) in the first plurality of oxide layers;
fabricating a second wafer that includes:
a second substrate;
a second plurality of oxide layers on the second substrate; and
a Pockels effect optical phase shifter in the second plurality of oxide layers;
bonding the first plurality of oxide layers to the second plurality of oxide layers;
removing the second substrate;
forming electrical connectors in the second plurality of oxide layers and the first plurality of oxide layers;
forming an undercut region in the first substrate; and
forming, on the second plurality of oxide layers,
a third plurality of oxide layers; and
one or more metal layers in the third plurality of oxide layers, the one or more metal layers in electrical connection with the electrical connectors.

15. A system on a semiconductor substrate, the system comprising:
a plurality of heralded photon sources, each heralded photon source of the plurality of heralded photon sources including a first output and a second output;
a plurality of delay lines, each delay line of the plurality of delay lines optically coupled to the first output of a respective heralded photon source of the plurality of heralded photon sources;
a plurality of single photon detectors, each single photon detector of the plurality of single photon detectors optically coupled to the second output of a respective heralded photon source of the plurality heralded photon sources; and
a switch network comprising:
a first crossing network including a first set of input ports and a first set of output ports, each input port of the first set of input ports optically coupled to an output of a respective delay line of the plurality of delay lines;
a second crossing network including a second set of input ports and at least one output port; and
a plurality of phase shifters between the first crossing network and the second crossing network, each phase shifter of the plurality of phase shifters optically coupling an output port of the first set of output ports of the first crossing network to an input port of the second set of input ports of the second crossing network.

16. The system of claim 15, wherein the plurality of delay lines includes SiN waveguides with a loss lower than 0.5 dB/m.

17. The system of claim 15, wherein the plurality of phase shifters includes a plurality of Pockels effect phase shifters.

18. The system of claim 15, wherein each single photon detector of the plurality of single photon detectors includes a superconductive nanowire single photon detector.

19. The system of claim 15, wherein the first crossing network includes a plurality of Mach-Zehnder interferometers.

* * * * *